United States Patent
DeLuca et al.

(10) Patent No.: US 12,309,111 B2
(45) Date of Patent: May 20, 2025

(54) CONTROLLING COMMUNICATIONS BASED ON CONTROL POLICIES WITH BLOCKCHAIN ASSOCIATED RULES AND BLOCKCHAIN AUTHORIZATION

(71) Applicant: Unstoppable Domains, Inc., Las Vegas, NV (US)

(72) Inventors: Lisa Seacat DeLuca, Bozeman, MT (US); Richard Jacob Protus, Reno, NV (US); Aaron Quirk, Raleigh, NC (US)

(73) Assignee: Unstoppable Domains, Inc., Las Vegas, NV (US)

( * ) Notice: Subject to any disclaimer, the term of this patent is extended or adjusted under 35 U.S.C. 154(b) by 0 days.

(21) Appl. No.: 18/122,379

(22) Filed: Mar. 16, 2023

(65) Prior Publication Data
US 2024/0314095 A1    Sep. 19, 2024

(51) Int. Cl.
*H04L 51/212*    (2022.01)
(52) U.S. Cl.
CPC .................................. *H04L 51/212* (2022.05)
(58) Field of Classification Search
CPC ........................... H04L 51/212; G06Q 10/107
See application file for complete search history.

(56) References Cited

U.S. PATENT DOCUMENTS

| | | | |
|---|---|---|---|
| 8,228,900 B2 | 7/2012 | Lindgren | |
| 9,553,981 B2 | 1/2017 | Czarnecki et al. | |
| 10,846,762 B1 * | 11/2020 | Dennis | G06Q 20/065 |
| 11,558,344 B1 | 1/2023 | Pezeshki et al. | |

(Continued)

FOREIGN PATENT DOCUMENTS

| | | | |
|---|---|---|---|
| CN | 1984185 A | | 6/2007 |
| KR | 20220066823 A | * | 5/2022 |
| WO | 2020/010023 A1 | | 1/2020 |

OTHER PUBLICATIONS

International Search Report and Written Opinion in International Application No. PCT/US23/68858, dated Oct. 19, 2023, 8 pages.

(Continued)

*Primary Examiner* — Caroline H Jahnige
(74) *Attorney, Agent, or Firm* — Edell, Shapiro & Finnan, LLC

(57) ABSTRACT

According to a present invention embodiment, a system for controlling communications comprises one or more memories and at least one processor coupled to the one or more memories. The system receives a communication for an intended recipient. The communication includes a communication identifier for the intended recipient that serves as a destination for the communication. The communication is verified against a communication control policy of the intended recipient. The communication control policy includes at least one condition for attributes of a blockchain identity of one or more users to control communications from the one or more users to the intended recipient. Transference of the communication to the intended recipient is controlled in accordance with the communication control policy. Embodiments of the present invention further include a method and computer program product for controlling communications in substantially the same manner described above.

21 Claims, 10 Drawing Sheets

(56) References Cited

U.S. PATENT DOCUMENTS

| | | | |
|---|---|---|---|
| 11,750,570 B1* | 9/2023 | Eby | H04L 61/50 |
| 2011/0124354 A1 | 5/2011 | Nagata | |
| 2014/0223283 A1 | 8/2014 | Hancock et al. | |
| 2015/0356523 A1 | 12/2015 | Madden | |
| 2016/0217436 A1 | 7/2016 | Brama | |
| 2016/0330027 A1 | 11/2016 | Ebrahimi | |
| 2017/0331810 A1 | 11/2017 | Kurian | |
| 2018/0204213 A1 | 7/2018 | Zappier et al. | |
| 2019/0096021 A1 | 3/2019 | Jarvis et al. | |
| 2019/0166085 A1 | 5/2019 | Li et al. | |
| 2020/0406859 A1 | 12/2020 | Hassani | |
| 2020/0409942 A1 | 12/2020 | Kasimov et al. | |
| 2021/0058353 A1* | 2/2021 | Creech | H04L 51/214 |
| 2022/0198049 A1* | 6/2022 | Dumas | H04L 9/0825 |
| 2022/0198444 A1 | 6/2022 | Mee et al. | |
| 2022/0210061 A1 | 6/2022 | Simu et al. | |
| 2023/0065364 A1 | 3/2023 | Aichinger | |
| 2023/0171225 A1 | 6/2023 | Pezeshki et al. | |
| 2023/0206218 A1* | 6/2023 | Defour | G06Q 20/02 705/67 |
| 2023/0281604 A1 | 9/2023 | Robell et al. | |
| 2023/0418979 A1 | 12/2023 | DeLuca et al. | |
| 2023/0421399 A1 | 12/2023 | Quirk et al. | |
| 2024/0056525 A1 | 2/2024 | DeLuca | |
| 2024/0146523 A1 | 5/2024 | DeLuca et al. | |
| 2024/0236076 A1 | 7/2024 | Paul | |
| 2024/0250931 A1 | 7/2024 | Seifert et al. | |

OTHER PUBLICATIONS

"Why Are Some Domains Protected?", Unstoppable Domains, Mar. 11, 2022, https://support.unstoppabledomains.com/support/solutions/articles/48001186091-why-are-some-domains-protected, 3 pages.

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"What is a non-fungible token (NFT)?", https://www.coinbase.com/learn/crypto-basics/plp-what-is-nft, downloaded from the internet on Mar. 25, 2022, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

James Beck, Blog, "Mirror.xyz Review: How To Use MetaMask To Compete In The $WRITE Race", Jul. 30, 2021, https://consensys.net/blog/metamask/mirror-xyz-review-how-to-use-metamask-to-compete-in-the-write-race, 14 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

"Unstoppable Domains launches Login with Unstoppable", https://unstoppabledomains.com/blog/introducing-login-with-unstoppable, Jan. 9, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/LSPs/LSP-6-KeyManager.md, downloaded from the internet on Oct. 14, 2022, 13 pages.

"Allowlists, denylists, and approved senders", Google Workspace Admin Help, https://support.google.com/a/answer/60752?hl=en#:~:text=Email allowlist—A list of, allowlist the contact's IP address 1, downloaded from the Internet on Oct. 31, 2022, 1 page.

"S/MIME Digital Signatures", GlobalCerts, https://globalcerts.com/smime-digital-signatures, downloaded from the Internet on Oct. 31, 2022, 5 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

International Search Report and Written Opinion in International Application No. PCT/US23/71399, dated Nov. 16, 2023, 10 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support.ens.domains/en/articles/7882690-claim-your-dns-name, downloaded from the internet on Feb. 9, 2024, 10 pages.

"Ethereum Name Service (ENS)", https://etherscan.io/token/0xc18360217d8f7ab5e7c516566761ea12ce7f9d72#readContract, downloaded from the internet on Feb. 9, 2024, 4 pages.

"Ethereum Name Service (ENS)", https://etherscan.io/token/0xc18360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.

"Introducing Blend: the Peer-to-Peer Perpetual Lending Protocol for NFT's", https://x.com/blur_io/status/1653051809240604674?s=20, downloaded from the internet Jun. 26, 2024, 2 pages.

Owen Fernau, "Blur Launches NFT Lending Protocol", The Defiant, https://thedefiant.io/news/nfts-and-web3/blur-nft-lending, May 2, 2023, 7 pages.

Mwrwan Abubakar, et al., "Blockchain-Based Authentication and Registration Mechanism for SIP-BASED VoIP Systems", 2021 5th Cyber Security in Networking Conference (CSNet), IEEE, 2021, 8 pages.

International Preliminary Report on Patentability in PCT/US2023/071399, issued Feb. 4, 2025, 5 pages.

\* cited by examiner

| NAME | COMMUNICATION IDENTIFIER | ALLOW / BLOCK | SIGNATURE | ENCRYPTION | ACTIONS | CONDITIONS |
|---|---|---|---|---|---|---|
| NAME 1 | EMAIL1 | ALLOW / BLOCK | Y/N/SIG TYPE | Y/N/ ENC TYPE | ACTION 1 ▶ | |
| NAME 2 | NAME2, E2 | ALLOW / BLOCK | Y/N/SIG TYPE | Y/N/ ENC TYPE | ACTION 2 ▶ | COND2 |
| NAME 3 | EMAIL3 | ALLOW / BLOCK | Y/N/SIG TYPE | Y/N/ ENC TYPE | ACTION 3 ▶ | |
| NAME 4 | NAME4, E4 | ALLOW / BLOCK | Y/N/SIG TYPE | Y/N/ ENC TYPE | ACTION 4 ▶ | COND4 |

FIG.7

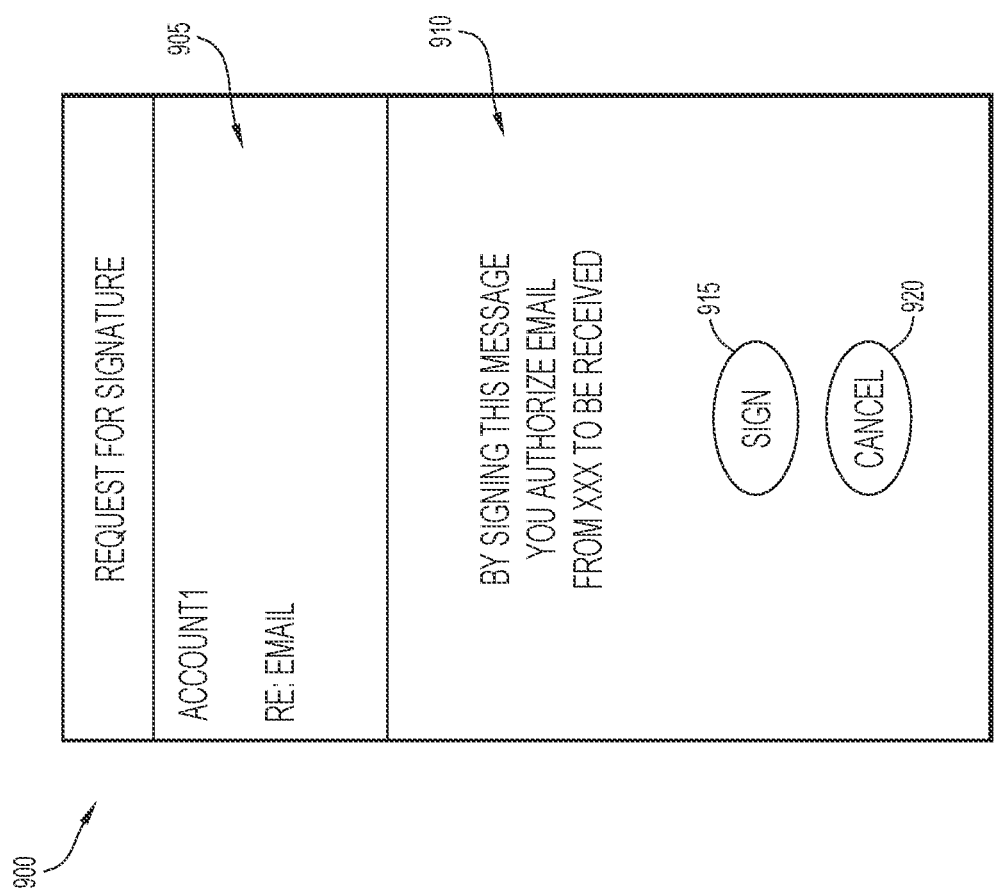

CONTROLLING COMMUNICATIONS BASED ON CONTROL POLICIES WITH BLOCKCHAIN ASSOCIATED RULES AND BLOCKCHAIN AUTHORIZATION

TECHNICAL FIELD

Present invention embodiments relate to computer security, and more specifically, to controlling transference (sending and/or receiving) of electronic mail (e-mail) messages and other communications in accordance with a control policy including blockchain associated rules and blockchain authorization.

BACKGROUND

Discussion of the Related Art

Spam is becoming commonplace for recipients of electronic mail (e-mail) messages. Various companies have introduced mechanisms to predict a likelihood of an incoming e-mail message being spam or a promotional message and to move these types of messages to a separate location. In addition, some electronic mail applications use allowlists, denylists, and approved senders to prevent or minimize disruption from spam or promotional messages. However, these techniques may provide limited protection.

SUMMARY

According to one embodiment of the present invention, a system for controlling communications comprises one or more memories and at least one processor coupled to the one or more memories. The system receives a communication for an intended recipient. The communication includes a communication identifier for the intended recipient that serves as a destination for the communication. The communication is verified against a communication control policy of the intended recipient. The communication control policy includes at least one condition for attributes of a blockchain identity of one or more users to control communications from the one or more users to the intended recipient. Transference of the communication to the intended recipient is controlled in accordance with the communication control policy. Embodiments of the present invention further include a method and computer program product (e.g., including one or more computer readable media with instructions executable by one or more processors) for controlling communications in substantially the same manner described above.

BRIEF DESCRIPTION OF THE DRAWINGS

Generally, like reference numerals in the various figures are utilized to designate like components.

FIG. 7 is a schematic illustration of an example graphical user interface for providing communication controls for a communication control policy according to an embodiment of the present invention.

FIG. 9 is a schematic illustration of an example graphical user interface of a wallet verification for verifying a user for defining communication controls for a communication identifier according to an embodiment of the present invention.

DETAILED DESCRIPTION

Figure 1:
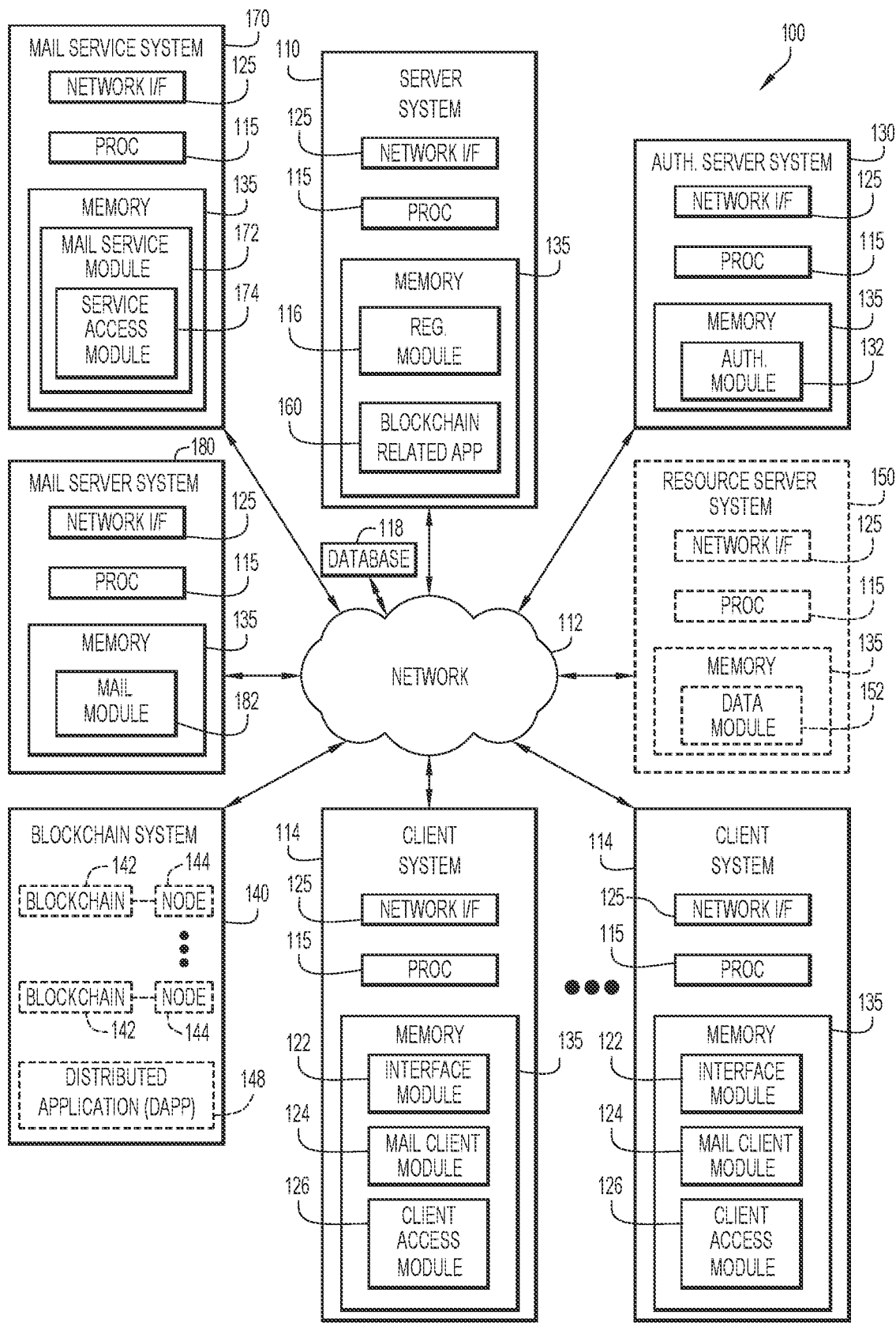
FIG. 1 is a diagrammatic illustration of an example computing environment according to an embodiment of the present invention.

Spam is becoming commonplace for recipients of electronic mail (e-mail) messages. Various companies have introduced mechanisms to predict a likelihood of an incoming message being spam or a promotional message and to move these types of messages to a separate location. In addition, some electronic mail applications use allowlists, denylists, and approved senders to prevent or minimize disruption from spam or promotional messages.

For example, an e-mail allowlist includes a list of Internet Protocol (IP) addresses that are defined and approved by a user to send e-mail messages to their domain. When legitimate e-mail messages from known contacts are incorrectly marked as spam, the user may add the IP address of an incorrectly marked contact to the list of IP addresses. Once an IP address is placed in the list, e-mail messages from that IP address are not labelled as spam. However, users who receive e-mail messages from that IP address may view a notification for those messages (e.g., indicating a suspicious message, etc.).

An e-mail denylist includes a list of e-mail addresses defined by a user that are blocked from sending e-mail messages to the user organization or domain. Administrators or other users may block domains or specific users from sending e-mail messages to the corresponding organization or domain. In addition, users may create a filter in their mailboxes to automatically send e-mail messages received from specific users or e-mail address lists to a particular folder. Users may also report unwanted e-mail messages as spam in order to assist spam filters to identify future spam.

In addition, approved senders are trusted users that send e-mail messages to an organization. An address list of approved senders including individual e-mail addresses and/or domains may be created by a user. The address list enables e-mail messages from these senders to bypass spam filters, where recipients may decide the status of the messages as spam.

A Secure/Multipurpose Internet Mail Extensions (S/MIME) digital signature may be used to ensure authenticity of an e-mail message. Digital signatures may guarantee the identity of the sender, and also protect contents of the e-mail message from being secretly modified.

However, employing these types of signatures for e-mail messages across an organization may be difficult. For example, a user private key must be protected from being discovered by any untrusted party, while the private key is required to be installed on all devices used to send e-mail messages (e.g., mobile phones, tablets, laptops, etc.). Further, devices and e-mail applications or clients may not be capable of, or permit, using a digital signature. By way of example, an e-mail client may not allow a user to digitally sign e-mail messages unless specific software controls are installed, specific browsers are used, and a specific application is employed.

Accordingly, a present invention embodiment employs blockchain technology (e.g., blockchain or wallet signatures, etc.) to streamline an approval process for transference (sending and/or receiving) of e-mail messages or other communications. Senders of e-mail messages may query a blockchain and verify that an intended recipient allows receipt of the e-mail message when using a blockchain digital signature. In addition, recipients of e-mail messages may further require senders to attach their blockchain digital signatures for identity verification.

A present invention embodiment may allow or reject e-mail messages or other communications based on existence and verification of control policies in a sovereign datastore (e.g. non-fungible token (NFT) metadata, etc.) associated with a recipient wallet address.

A present invention embodiment provides control of e-mail messages or other communications by enabling a user of a blockchain identity to set various communication controls for senders of the communications in a communication control policy (e.g., allow or block the senders, requirements for digital signatures, requirements for encryption, satisfaction of blockchain related or other conditions or prerequisites, etc.). The senders may be identified based on a communication identifier. A communication identifier may include any identifier that is associated with, and/or may be used to identify or resolve to, a user, location, and/or address for communication (e.g., e-mail address, handles, mobile phone numbers, blockchain identity, etc.). A blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). The blockchain identity is preferably associated with a user wallet, and information of the user may further be associated with the blockchain identity. In other words, the blockchain identity serves as a type of user identification on a blockchain to identify a particular user, and may be associated with various user information and/or attributes. A wallet associated with the blockchain identity may be used to verify a user of the blockchain identity based on the user signing a message within the wallet using cryptographic keys.

An example environment 100 for use with present invention embodiments is illustrated in FIG. 1. Specifically, environment 100 includes one or more server systems 110, one or more client or end-user systems 114, one or more authentication server systems 130, and one or more blockchain systems 140 each implementing and maintaining at least one corresponding blockchain 142. Environment 100 may further include one or more resource server systems 150, one or more mail service systems 170, and one or more mail server systems 180. Server systems 110, client systems 114, authentication server systems 130, blockchain systems 140, resource server systems 150, mail service systems 170, and/or mail server systems 180 may be remote from each other and communicate over a network 112. The network may be implemented by any number of any suitable communications media (e.g., wide area network (WAN), local area network (LAN), Internet, Intranet, etc.). Alternatively, server systems 110, client systems 114, authentication server systems 130, blockchain systems 140, resource server systems 150, mail service systems 170, and/or mail server systems 180 may be local to each other, and communicate via any appropriate local communication medium (e.g., local area network (LAN), hardwire, wireless link, Intranet, etc.).

Server systems 110 include a registration module 116. Registration module 116 interfaces with a user via client system 114 to perform blockchain or other domain name registration, manage crypto or other assets for users, and/or manage communication control policies. Client systems 114 may include an interface module 122 to provide a graphical user (e.g., GUI, etc.) or other interface (e.g., command line prompts, menu screens, etc.) that enables users to access server systems 110 for registering blockchain or other domain names, managing crypto or other assets, and/or managing communication control policies. The interface module may include any conventional or other browser to access server systems 110. Client systems 114 may further include a mail client module 124 to generate, send, and receive e-mail messages, and a client access module 126 that enables retrieval of corresponding communication control policies for communications.

Authentication server systems 130 include an authentication module 132 that authenticates an application or user (corresponding to a blockchain identity). The blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). The authentication module may process requests from any entities (e.g., user, application, service, computing or other device, etc.).

Blockchain systems 140 may each include one or more nodes 144 to implement and maintain at least one corresponding blockchain 142. The nodes may be implemented by any suitable computing devices (e.g., as described below for FIG. 2). The blockchain is generally in the form of a ledger that includes a series of records or blocks chained or linked together. The blockchain is typically managed by a peer-to-peer network (of nodes 144) and used as a distributed ledger. Nodes 144 of the peer-to-peer network communicate and verify new blocks according to a protocol. The peer-to-peer network provides a decentralized approach, where each node has a copy of a blockchain 142. Transactions are transmitted to the peer-to-peer network, where mining nodes (nodes 144) process the transactions. The mining nodes validate a transaction, insert the transaction into a current block, and transmit the block to the other nodes. Blockchain 142 may be implemented by any conventional or other blockchain, and may be a public (e.g., no access restrictions, etc.), private (e.g., restricted access, etc.), or hybrid (e.g., with centralized and decentralized features) blockchain.

Blockchain systems 140 may include one or more distributed or decentralized applications (dApps) 148 to perform various operations (e.g., financial or other transactions related to a blockchain; generate, send, and/or receive communications; etc.). The distributed applications (dApps) enable use of communication control policies defined by users of blockchain identities for controlling communications by senders to those users as described below. In other words, the blockchain identities may be associated with the same and/or various different blockchains (e.g., with respect to the blockchain associated with the application).

Interface module 122 of client systems 114 may further provide a graphical user (e.g., GUI, etc.) or other interface (e.g., command line prompts, menu screens, etc.) that enables users to access distributed applications (dApps) 148 on blockchain systems 140 for performing various operations (e.g., financial or other transactions related to a blockchain; generating, sending, and/or receiving communications; etc.). The interface module may include any conventional or other browser to access the distributed applications (dApps) of blockchain systems 140. The interface module may natively, or include extensions to, access the distributed applications (dApps). The interface module may provide a user interface to serve as a front end for a distributed application (dApp) 148, where back end processing for the distributed application (dApp) is performed on a blockchain system 140. Client systems 114 may further provide reports or notifications pertaining to requests from users (e.g., results of sending a communication, verification results, additional conditions required by the recipient for sending a communication, etc.).

Server systems 110 may further include one or more blockchain related applications 160 for performing various operations (e.g., financial or other transactions related to a blockchain; generating, sending, and/or receiving communications, etc.). Registration module 116 and blockchain related applications 160 may be on the same or different server systems 110. In this case, interface module 122 may further provide a graphical user (e.g., GUI, etc.) or other interface (e.g., command line prompts, menu screens, etc.) that enables users to access blockchain related applications 160 on server systems 110 for performing the various operations (e.g., financial or other transactions related to a blockchain; generating, sending, and/or receiving communications; etc.). The interface module may include any conventional or other browser to access server systems 110.

Resource server systems 150 include a data module 152 that may store and retrieve communication control policies including communication controls defined by recipients for senders of communications. The resource server systems may provide off-chain storage and access for the communication control policies and/or other information (e.g., application data, user information, etc.).

A database system 118 may store various information (e.g., communication control policies, mappings of blockchain identities to blockchains, etc.). The database system may be implemented by any conventional or other database or storage unit, may be local to or remote from server systems 110, client systems 114, authentication server systems 130, blockchain systems 140, resource server systems 150, mail service systems 170, and/or mail server system 180, and may communicate via any appropriate communication medium (e.g., local area network (LAN), wide area network (WAN), Internet, hardwire, wireless link, Intranet, etc.).

Mail service system 170 includes a mail service module 172 that processes communications and enables use of public and private e-mail addresses for users. The public e-mail address may be distributed for use by senders of communications, while the private e-mail address corresponds to a mailbox that actually receives the e-mail messages. Thus, the public e-mail address serves as an alias e-mail address and is used for directing communications to mail service system 170 for verification against corresponding communication control policies. The private e-mail address is maintained confidential, and used to direct communications to a corresponding user mailbox. The mail service system further includes a service access module 174 that enables retrieval of corresponding communication control policies for communications.

Mail server system 180 includes a mail module 182 that handles delivery of e-mail messages between senders and recipients. The mail module may be implemented by any conventional or other e-mail applications.

Server systems 110, client systems 114, authentication server systems 130, resource server systems 150, mail service systems 170, and mail server systems 180 may be implemented by any conventional or other computer systems preferably equipped with a display or monitor, a base, optional input devices (e.g., a keyboard, mouse or other input device), and any software for use by present invention embodiments (e.g., server/communications software, blockchain software, registration module 116, interface module 122, mail client module 124, client access module 126, authentication module 132, data module 152, blockchain related applications 160, mail service module 172, service access module 174, mail module 182, etc.). The base may include at least one hardware processor 115 (e.g., microprocessor, controller, central processing unit (CPU), etc.), one or more memories 135, and/or internal or external network interfaces or communications devices 125 (e.g., modem, network cards, etc.)).

Registration module 116, interface module 122, mail client module 124, client access module 126, authentication module 132, data module 152, distributed applications (dApps) 148, blockchain related applications 160, mail service module 172, service access module 174, and mail module 182 may include one or more modules or units to perform the various functions of present invention embodiments described below. The various modules (e.g., registration module 116, interface module 122, mail client module 124, client access module 126, authentication module 132, data module 152, blockchain related applications 160, mail service module 172, service access module 174, mail module 182, etc.) may be implemented by any combination of any quantity of software and/or hardware modules or units, and may reside within memory 135 of the sever, client, and/or other systems for execution by a corresponding processor 115. The various modules of the blockchain (e.g., distributed applications (dApps) 148, etc.) may be implemented by any combination of any quantity of software and/or hardware modules or units, and may reside on a blockchain 142 for execution by one or more nodes 144.

Figure 2:
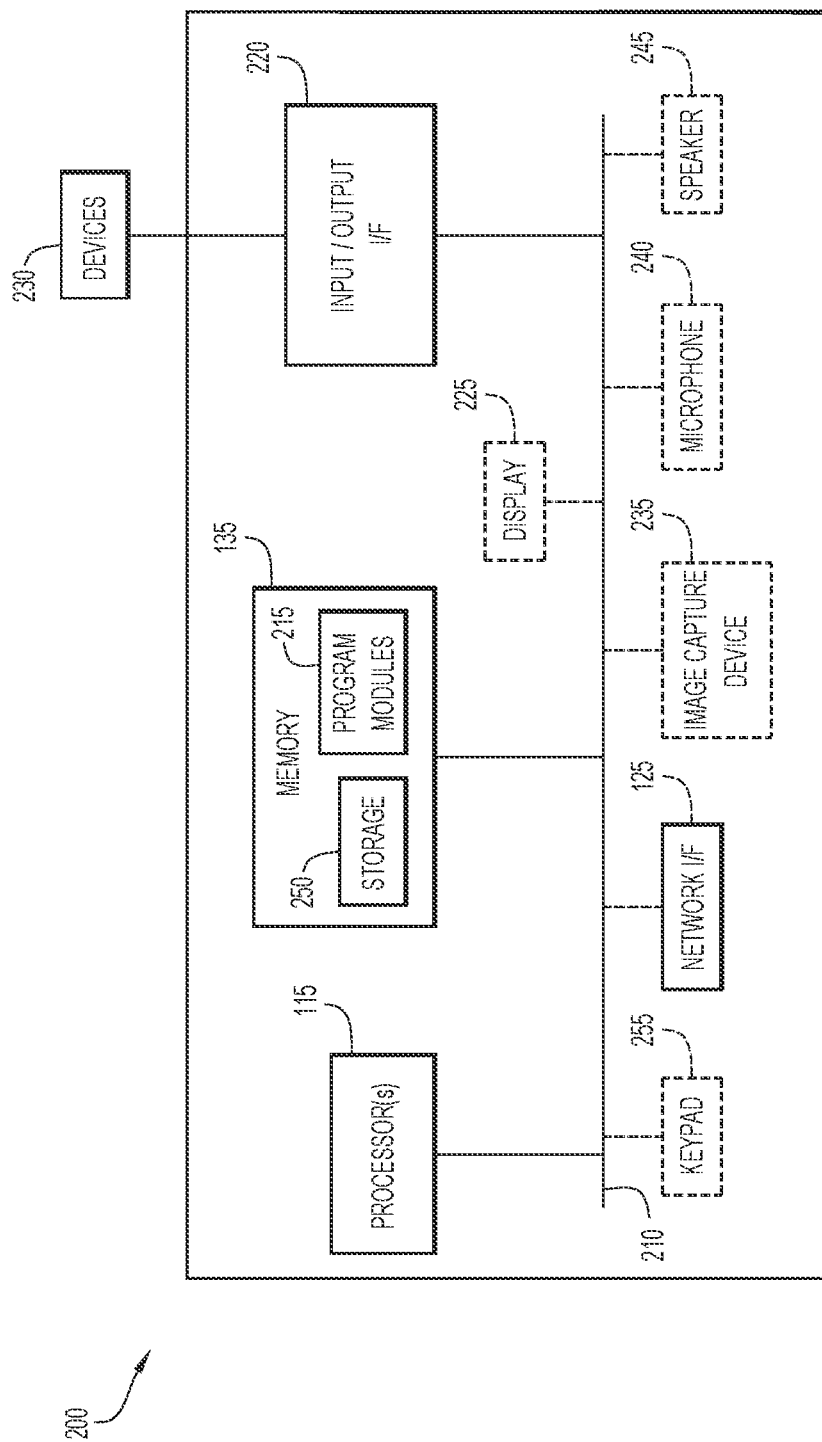
FIG. 2 is a block diagram of an example computing device according to an embodiment of the present invention.

An example of a computing device 200 for environment 100 (e.g., implementing server systems 110, client systems 114, authentication server systems 130, blockchain systems 140, nodes 144, resource server systems 150, mail service systems 170, mail server systems 180, etc.) is illustrated in FIG. 2. The example computing device may perform the functions of present invention embodiments described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 115 (e.g., microprocessor, controller, central processing unit (CPU), etc.), network interface 125, memory 135, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 135 is coupled to bus 210 and typically includes computer readable media including volatile media (e.g., random access memory (RAM), cache memory, etc.), non-volatile media, removable media, and/or non-removable media. For example, memory 135 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 135 includes a set of program modules 215 (e.g., corresponding to registration module 116, interface module 122, mail client module 124, client access module 126, authentication module 132, data module 152, blockchain software (e.g., distributed applications (dApp) 148, blockchain management software, etc.), blockchain related applications 160, mail service module 172, service access module 174, mail module 182, network site or service software, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 125 coupled to bus 210.

With respect to certain entities (e.g., client system 114, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

Initially, a blockchain (e.g., blockchain 142, etc.) is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alter the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFTs), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

In addition, a blockchain may store software (e.g., typically referred to as smart contracts) that executes in response to occurrence of pre-defined conditions. A smart contract is generally software or a program that runs on the blockchain. The code and data for the smart contract reside at a specific address on the blockchain. Non-fungible tokens (NFTs) are controlled by smart contracts that handle transference and verification of ownership of the non-fungible tokens (NFTs). A blockchain may be public (e.g., no access restrictions, etc.), private (e.g., restricted access, etc.), or hybrid (e.g., with centralized and decentralized features).

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, e-mail addresses, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that alter content and/or functionality for the blockchain domain name.

Figure 3:
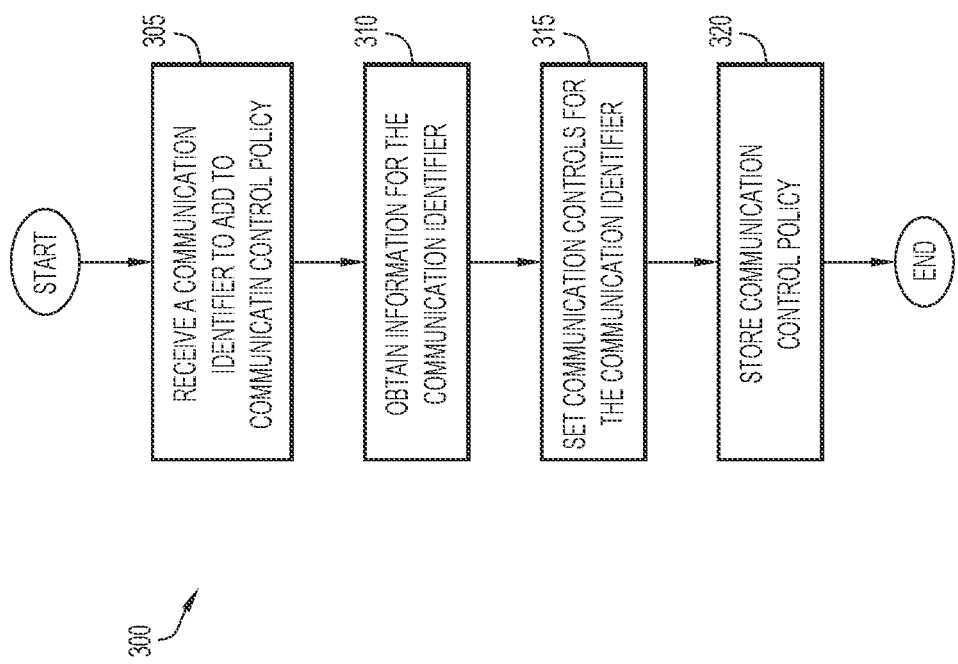
FIG. 3 is a flowchart of a method of creating communication controls for a blockchain identity according to an embodiment of the present invention.

A method 300 of creating communication controls for a blockchain identity (e.g., via registration module 116, distributed or decentralized application 148, blockchain related application 160, server system 110, client system 114, blockchain system 140, and/or resource server system 150) according to an embodiment of the present invention is illustrated in FIG. 3. Initially, users may register blockchain or other domain names, update a user profile, manage crypto or other assets, and/or manage communication control policies via registration module 116. The user profile for a user may contain various user information (e.g., name, mailing address, blockchain (or wallet) address of the user, private and/or public e-mail addresses, etc.) and be stored on a blockchain 142 (e.g., on-chain) or in a database (e.g., off-chain) and be associated with the user and/or user domain names or other assets.

The user may further register with an e-mail service (e.g., mail service module 172) that provides a public e-mail address for the user (and associates the public e-mail address with a contact or private e-mail address). The contact or private e-mail address corresponds to an account or mailbox for the user to receive e-mail messages, and a public e-mail address is used for controlling communications and maintaining privacy of the private e-mail address. The public and private e-mail addresses of the user may be maintained within the user information on the user profile. The private and public e-mail addresses may include any quantity of terms, words, tokens, or arrangements of any quantity of any types of elements (e.g., alphanumeric or other characters, symbols, numbers, etc.). For example, the private and public e-mail addresses may include a name/account portion and a domain (or address identifier) portion (e.g., "name@domain", etc.). The name/account portion and domain portion may each include any quantity of terms, words, tokens, or arrangements of any quantity of any types of elements (e.g., alphanumeric or other characters, symbols, numbers, etc.). The public e-mail address includes a domain portion directing e-mail messages to mail service system 170, while the private e-mail address is used to direct e-mail messages to the user mailbox.

A user desires to control e-mail messages or other communications received by the user. The user may log in to an application (e.g., registration module 116, distributed or decentralized application 148, blockchain related application 160, etc.) via any conventional or other process (e.g., username/password, wallet verification, etc.). The application may enable creation and modification of communication control policies for a user associated with a blockchain identity. A blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). The communication control policy includes communication controls for receiving communications from other users.

The application (e.g., registration module 116, distributed or decentralized application 148, blockchain related application 160, etc.) receives a communication identifier from the user at operation 305 for which communication controls are to be established and inserted in the communication control policy. The communication identifier may be entered by the user on a user interface of a client system 114 for the application (e.g., as described below for FIGS. 7 and 8). The communication identifier corresponds to another user to control communications from the other user (according to the communication control policy). A communication identifier may include any identifier that is associated with, and/or may be used to identify or resolve to, a user, location, and/or address for communication (e.g., e-mail address, handles, mobile phone numbers, blockchain identity, etc.). A blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.).

Information for the communication identifier may be retrieved by the application (e.g., registration module 116, distributed or decentralized application 148, blockchain related application 160, etc.) at operation 310. For example, the data for a non-fungible token (NFT) type identity stored on a blockchain (on-chain) is a publicly available and verifiable source of additional information. In the case of non-fungible token (NFT) domains, the data may also be stored external of the blockchain (off-chain) in a database (e.g., database system 118, resource server system 150, etc.) and accessible through scopes or application programming interfaces (APIs) of associated distributed or decentralized applications (dApps) 148 or blockchain related applications 160. A scope basically enables an application to request limited access to a user's data. The scopes may limit data access to publicly available blockchain data and/or private off-chain user added information. Blockchain specific scopes may include a number or value of blockchain tokens, a number or value of non-fungible tokens (NFTs), a number of transactions, and/or an age of transactions. The blockchain scopes are verifiable based on information from the blockchain. User added scopes may also be stored in the associated data of a non-fungible token (NFT) identity. The user scopes are diverse and easily extended, and may include social media handles, associated crypto currency addresses (e.g., pay to accounts), personal details (e.g., name, address, birthday, etc.), contacts (e.g., phone, e-mail address, address book, etc.), and/or verifications (e.g., identification check, e-mail/phone verification, etc.). The scopes may be used to maintain confidentiality of the private e-mail address.

Once a communication identifier is entered, information associated with the communication identifier may be retrieved from the blockchain and/or off-chain storage. For example, the communication identifier may include a non-fungible token (NFT) domain name. A blockchain associated with the non-fungible token (NFT) domain name may be searched for the non-fungible token (NFT) domain name to ascertain the information. The non-fungible token (NFT) domain name (and/or information from the blockchain) may be used to search off-chain storage for the information. The information may include one or more wallet addresses, a display name, an e-mail address, a location, and/or on-chain activity (e.g., based on transactions stored on the blockchain, etc.). By way of further example, the communication identifier may include an e-mail address. A blockchain (or other data source) may be searched for the e-mail address to identify a corresponding user and retrieve additional information (e.g., one or more wallet addresses, a display name, a location, and/or on-chain activity (e.g., based on transactions stored on the blockchain, etc.)). The information retrieved for the communication identifier may be also be stored with the communication control policy for various actions (e.g., wallet addresses for digital signatures, on-chain activity for evaluating conditions of the communication control policy, etc.).

By way of example, the communication control policy may implement an allow list and/or a deny list, and further include conditions or prerequisites for senders to satisfy (e.g., FIG. 7). The allow list may indicate specific e-mail addresses or other communication identifiers that are permitted or allowed to send e-mail messages to the user, conditions for on-chain activity (e.g., owning certain non-fungible tokens (NFT), etc.) that are to be satisfied to send communications to the user, and/or addresses used by distributed or other applications permitted or allowed to send communications to the user. The deny list may indicate specific e-mail addresses or other communication identifiers that are denied or blocked from sending e-mail messages to the user, conditions for on-chain activity (e.g., owning certain non-fungible tokens (NFT), etc.) that when satisfied cause communications to the user to be denied or blocked, and/or addresses used by distributed or other applications that are denied or blocked from sending communications to the user. The communication control policy may further indicate requiring digital signatures (e.g., blockchain or wallet signature, Secure/Multipurpose Internet Mail Extensions (S/MIME) signature, etc.) and/or encryption. The communication control policy includes various communication controls that may implement these types of control scenarios.

Communication controls (e.g., allow or block actions for senders, requirements for digital signatures, requirements for encryption, satisfaction of blockchain related or other conditions or prerequisites, etc.) for the communication identifier are provided for the communication control policy at operation 315. The communication controls may be entered by the user on a user interface of a client system 114 for the application (e.g., as described below for FIGS. 7 and 8).

The allow or block actions indicate permitting or blocking communications from the communication identifier, while the requirements for digital signatures indicate a requirement for a digital signature and the type of digital signature required for communications from the communication identifier. The requirements for encryption indicate a requirement for encryption and the type of encryption required for communications from the communication identifier. The conditions or prerequisites indicate the conditions or events for which communications from the communication identifier are permitted or blocked (depending o the allow or block actions). The prerequisites may indicate logical or other expressions with attributes corresponding to labels or other identifiers of data stored with the information associated with the blockchain identity.

The conditions may be based on information associated with the communication identifier retrieved from the blockchain and/or off-chain storage. In other words, specific types of verifiable user data may be required for the user to leverage a communication control policy. For example, certain on-chain activity may be a prerequisite for permitting or blocking communications from the communication identifier. By way of example, the user may assign an allow action to a communication identifier with a prerequisite that the communication identifier has a specific kind of crypto token in the wallet of the communication identifier. The actions of the communication control policy may be adjusted as the blockchain activity of the user of the communication identifier changes. For example, transfer of a non-fungible token (NFT) may alter a user status (e.g., remove the user of a communication identifier from a community, change a number of non-fungible tokens (NFT) pertaining to the community, etc.), where actions of the communication control policy may change based on the blockchain activity. Further, communications from the user of a communication identifier may be allowed upon the user belonging to a community for a year or other time interval.

Further, in the event an identity of the user of the communication identifier has been verified through a know your customer (KYC) or similar verification process (e.g., the verification is stored in the information associated with the communication identifier), the communication controls may allow communications for those users. For example, an allow action may be assigned to a verified or trusted user as opposed to a block action or a requirement of a blockchain signature for an unverified or untrusted user. A Know Your Customer (KYC) type method generally pertains to verifying a customer identity and assessing risk (e.g., with respect to compliance with Anti-Money Laundering (AML) and other laws, etc.). The method basically requires customers to provide documentation, and includes proof of customer identity, evaluation of a level of risk, and monitoring customer activity patterns.

The proof of customer identity requests information from a customer to prove customer identity, such as a government or other officially issued identification (e.g. driver's or other license, passport, etc.), financial references or statements, information from a consumer or other reporting agency or public database, etc. This may employ proof of identity (with a photograph or image) and proof of address. Proof of address may be shown based on a variety of documents (e.g., passport, driving license, utility bill (electricity, gas, etc.), telephone bill, bank statement, credit card statement, etc.).

The evaluation of a level of risk examines the types of activities or transactions of a customer to determine a risk level that indicates a frequency of monitoring. The monitoring customer activity patterns monitors customer activity or transactions for unusual or outlier activities. The various verifications of the Know Your Customer (KYC) type method may be performed manually and/or automatically by the system (e.g., server system 110 and client system 114, etc.) based on analyzing provided documents and/or comparisons of official identifications to images of users utilizing various conventional or other image processing and/or natural language processing techniques (e.g., comparing an image of a user captured by a client system 114 to an official identification of the user, etc.).

Moreover, the conditions or prerequisites may be based on the information associated with the communication identifier from the blockchain and/or off-chain storage. For example, communications may be allowed based on a user having been verified through a know your customer (KYC) or similar verification process (e.g., the verification is stored in the information associated with the blockchain identity). Similarly, a prerequisite may block communications or require a blockchain signature from an unverified user. Further, allowing communications may be based on a user having a specific type of non-fungible token (NFT) (e.g., digital art, etc.), and/or having a crypto account with a certain balance or value (e.g., above, at, or below a threshold value, such as a balance or value greater than $1000, etc.). Moreover, communications may be allowed based on a user having a quantity and type of non-fungible tokens (NFTs) (e.g., above, at, or below a threshold quantity, such as greater than 100 total domains, etc.). In addition, communications may be allowed based on other attributes or combinations of attributes (e.g., age, location, social media presence, e-mail and/or social media account, contacts, etc.) For example, communications may be allowed from a user over 18 years of age who lives in the U.S. with a verified e-mail address and a verified social media account having a threshold quantity of followers (e.g., greater than 10,000 followers, etc.), or to a user with a certain quantity of common contacts (e.g., five or more contacts in common with the user defining the communication control policy, etc.)).

Further, the communication controls may be determined for the communication identifier by the application (e.g., registration module 116, distributed or decentralized application 148, blockchain related application 160, etc.). These may be based on the information associated with the communication identifier from the blockchain and/or off-chain storage. For example, communications may be allowed from a user that user has been verified through a know your customer (KYC) or similar verification process. Further, digital signatures may be required from unverified users. The communication controls may be assigned based on rules indicating conditions for a user and the corresponding communication control settings.

The communication controls are added or inserted into the communication control policy, and the communication control policy is stored at operation 320. The communication control policy may be updated and stored by the application (e.g., registration module 116, distributed or decentralized application 148, blockchain related application 160, etc.). The stored information may be associated with the blockchain identity of the user defining the communication control policy (e.g., to differentiate communication control policies for different users, etc.), and may be stored alongside the contact or private e-mail address in the user profile information. The communication control policy may be stored on the blockchain (or on-chain) and/or in a database or other storage structure (e.g., database system 118, resource server system 150, etc.) external of the blockchain (e.g., as off-chain metadata, etc.). The communication control policy may be encrypted depending on implementation and privacy concerns.

On-chain storage has a benefit of transparency for users to be able to determine the requirements for sending communications. The communication control policy may be stored on the blockchain at a blockchain address of the user defining the communication control policy. For example, the communication control policy for a blockchain identity for managing authorizations may be stored with the blockchain identity of the user. This provides advantages for user maintenance and greater sharing.

Off-chain storage has an advantage of lower fees and additional privacy. Further, the wallet address or associated information for the communication identifier may also be stored or persisted with the communication control policy (on-chain or off-chain) to enable rapid retrieval.

In addition, the communication control policy may use scopes which can be stored with the communication control policy on or off-chain in substantially the same manner described above. The scopes may control access to the communication control policy by users and/or distributed or other applications.

Further, one or more communication identifiers may be indicated by a bulk type entry, such as a regular expression (or regex) (e.g., with wildcard characters). This type of expression indicates a series of characters that specifies a pattern for text. For example, the regular expression ^[a-z0-9](\.?[a-z0-9]){5,}\.tld$ may be used to indicate non-fungible token (NFT) domain names having a certain top level domain (tld) as the communication identifier. In this case, the communication controls (e.g., allow or block the senders, requirements for digital signatures, requirements for encryption, satisfaction of blockchain related or other conditions or prerequisites, etc.) for this expression apply to the domain names indicated by the expression.

A present invention embodiment may be implemented on a server system 110 (e.g., registration module 116 and blockchain related application 160), client system 114 (e.g., mail client module 124), blockchain system 140 (e.g., distributed application (dApp) 148), and/or mail service system 170 (e.g., mail service module 172). For example, an e-mail client application (e.g., mail client module 124, distributed application (dApp) 148, blockchain related application 160, etc.) may query a blockchain for a communication control policy to determine that a sender is allowed to send e-mail messages to a user and any additional requirements for the communication (e.g., digital signature, encryption, etc.). Alternatively, these operations may be performed by a server system (e.g., mail service system 170, etc.) that provides results to an e-mail client application. In addition, the server system may query the blockchain and apply the communication control policy for e-mail messages. The e-mail messages may be generated in the client or server system, where the server system may support direct application programming interface (API) access or monitor blockchain events.

Figure 4:
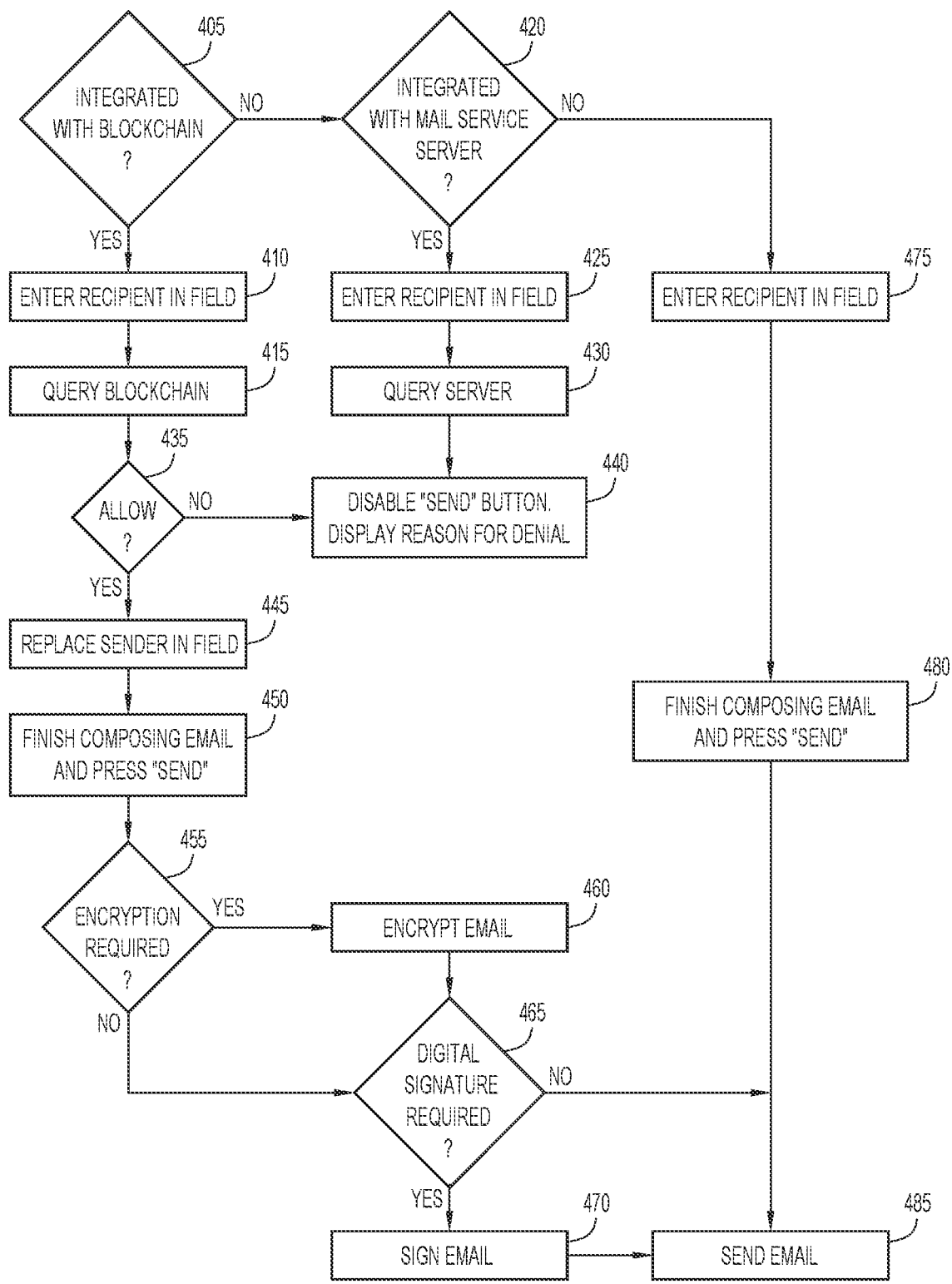
FIG. 4 is flowchart of a method of transmitting an e-mail message based on a communication control policy according to an embodiment of the present invention.

A method 400 of transmitting an e-mail message based on a communication control policy (e.g., via interface module 122, mail client module 124, distributed application (dApp) 148 or blockchain related application 160, server system 110, client system 114, and/or blockchain system 140) according to an embodiment of the present invention is illustrated in FIG. 4. Initially, a communication control policy is created by a user of a blockchain identity for controlling communications to the user as described above. The communication control policy may include communication controls for one or more other users and be stored on a blockchain or in off-chain storage (e.g., database system 118, resource server system 150, etc.) as described above. By way of example, method 400 is described with respect to sending e-mail messages. However, various other communications (e.g., Voice Over IP (VOIP), social media postings or messages, text messages, phone calls, etc.) may be controlled in accordance with a communication control policy in substantially the same manner described below.

An e-mail entity (e.g., user or an application) intends to contact a blockchain user with a blockchain identity by e-mail, and ascertains the blockchain identity. For example, the e-mail user may know the blockchain or wallet address of the blockchain user, the blockchain domain name of the blockchain user (corresponding to the blockchain identity), or the public e-mail address of the blockchain identity of the blockchain user. The blockchain domain name and public e-mail address can verifiably be resolved to the blockchain or wallet address (e.g., based on querying a blockchain, etc.).

An application (e.g., mail client module 124, distributed application (dApp) 148, blockchain related application 160, etc.) composes an e-mail message to send to an intended recipient having a blockchain identity. The application may be configured in various manners. For example, the application may be integrated with, or configured for, blockchain functionality, and may access the blockchain for sending the e-mail message. Further, the application may be integrated with mail service system 170, and may utilize an application programming interface (API) to provide the e-mail message to the mail service system. In addition, the application may be configured to provide the e-mail message to mail sever system 180.

When the application (e.g., mail client module 124, distributed application (dApp) 148, blockchain related application 160, etc.) is integrated with, or configured for blockchain functionality as determined at operation 405, a communication identifier for the e-mail message is received from the user at operation 410 and may serve as a destination for the e-mail message. The communication identifier is preferably a blockchain identity of the intended recipient, and may be provided on a user interface of client system 114 (e.g., as described below for FIG. 10A). The blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). Further, the blockchain identity may include any quantity of terms, words, tokens, or arrangements of any quantity of any types of elements (e.g., alphanumeric or other characters, symbols, numbers, etc.). For example, the blockchain identity may include a name portion and an optional extension (e.g., "name.e1", etc.). Alternatively, the blockchain identity may include the name portion without the extension. The name portion and extension may each include any quantity of terms, words, tokens, or arrangements of any quantity of any types of elements (e.g., alphanumeric or other characters, symbols, numbers, etc.). The application queries a blockchain 142 (or database system 118, resource server system 150, etc.) for the communication control policy of the intended recipient based on the received blockchain identity at operation 415.

When the application (e.g., mail client module 124, distributed application (dApp) 148, blockchain related application 160, etc.) is integrated with mail service system 170 as determined at operation 420, a communication identifier for the e-mail message is received from the user at operation 425. The communication identifier may serve as a destination for the e-mail message. The communication identifier is preferably a blockchain identity of the intended recipient, and may be provided on a user interface of client system 114 (e.g., as described below for FIG. 10A). The blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). Further, the blockchain identity may include any quantity of terms, words, tokens, or arrangements of any quantity of any types of elements (e.g., alphanumeric or other characters, symbols, numbers, etc.). For example, the blockchain identity may include a name portion and an optional extension (e.g., "name.e1", etc.). Alternatively, the blockchain identity may include the name portion without the extension. The name portion and extension may each include any quantity of terms, words, tokens, or arrangements of any quantity of any types of elements (e.g., alphanumeric or other characters, symbols, numbers, etc.). The application queries mail service system 170 for the communication control policy of the intended recipient based on the received blockchain identity at operation 430.

Once the corresponding communication control policy is retrieved at operation 415 or 430, the communication controls in the communication control policy specified for the user are applied to the user at operation 435. The communication control policy indicates communication controls for communication identifiers of users including allow or block actions for senders, requirements for digital signatures, requirements for encryption, and/or satisfaction of blockchain related or other conditions or prerequisites.

For example, the application (e.g., mail client module 124, distributed application (dApp) 148, blockchain related application 160, etc.) may examine the communication control policy for the presence of a communication identifier of the user. The communication identifier of the user may be retrieved by the application (e.g., with knowledge of the user e-mail address, retrieved from a sender field of the e-mail message, etc.). When the communication identifier of the user is not present in the communication control policy, the user is permitted to send the e-mail message (since no restrictions are present).

When the communication identifier of the user is present in the communication control policy, the application (e.g., mail client module 124, distributed application (dApp) 148, blockchain related application 160, etc.) determines a presence of a condition or prerequisite for the communication identifier of the user in the communication control policy. When a condition or prerequisite exists, the application retrieves the corresponding information (e.g., attributes, etc.) from a blockchain or off-chain storage (e.g., database system 118, resource server system 150, etc.) to determine satisfaction of the condition. The condition or prerequisite may be based on the information associated with the communication identifier of the user (e.g., e-mail address, blockchain identity, etc.) from the blockchain and/or off-chain storage. For example, the condition or prerequisite may be based on the user having been verified through a know your customer (KYC) or similar verification process, having a specific type of non-fungible token (NFT) (e.g., digital art, etc.), having a crypto account with a certain balance or value, having a quantity of non-fungible tokens (NFTs), and/or other attributes or combinations of attributes (e.g., age, location, social media presence, e-mail and/or social media account, contacts, etc.).

When the condition is not satisfied, the corresponding allow or block action indicated in the communication policy is not performed. For example, when an allow action is specified in the communication control policy and the corresponding conditions are not satisfied, this indicates the sender is to be blocked. Similarly, when a block action is specified in the communication control policy and the corresponding conditions are not satisfied, this indicates the sender is to be allowed.

When the condition does not exist or is satisfied, the corresponding allow or block action indicated in the communication control policy may be performed. For example, when an allow action is specified in the communication control policy and the corresponding conditions are satisfied or not specified, this indicates the sender is to be allowed. Similarly, when a block action is specified in the communication control policy and the corresponding conditions are satisfied or not specified, this indicates the sender is to be blocked.

When the user is not authorized to send the e-mail message to the intended recipient based on the communication control policy as determined at operation 435, the application (e.g., mail client module 124, distributed application (dApp) 148, blockchain related application 160, etc.) disables the transmission of the e-mail message (e.g., send button or other input mechanism is disabled on the user interface, etc.), and the reason for termination of the e-mail message is displayed at operation 440. The reason may include the communication control policy blocking communications for the user, and/or failure to satisfy the conditions or prerequisites indicated in the communication control policy.

When the user is verified to send e-mail messages to the intended recipient based on the communication control policy as determined at operation 435, the application (e.g., mail client module 124, distributed application (dApp) 148, blockchain related application 160, etc.) replaces the blockchain identity of the intended recipient with the public e-mail address of the intended recipient (e.g., from a blockchain or off-chain storage) in the e-mail message at operation 445. This directs the e-mail message to mail service system 170 for verification, and maintains confidentiality of the recipient private e-mail address. The e-mail message is completed and the application receives a command to send the e-mail message at operation 450 (e.g., send button or other input mechanism on the user interface is actuated, etc.).

When encryption is indicated for the e-mail message in the communication control policy as determined at operation 455, the application (e.g., mail client module 124, distributed application (dApp) 148, blockchain related application 160, etc.) encrypts the e-mail message at operation 460. The encryption may utilize any conventional or other encryption techniques (e.g., public/private key, etc.), where the encryption technique may be predetermined or pre-configured, or may be specified in the communication control policy.

After processing for encryption at operations 455 and 460, when a digital signature is not indicated for the e-mail message in the communication control policy as determined at operation 465, the application (e.g., mail client module 124, distributed application (dApp) 148, blockchain related application 160, etc.) sends the e-mail message at operation 485. The e-mail message is directed to mail module 182 of mail server system 180 for processing, where mail module 182 forwards the e-mail message to mail service system 170 based on the public e-mail address.

When a digital signature is indicated for the e-mail message in the communication control policy as determined at operation 465, the application (e.g., mail client module 124, distributed application (dApp) 148, blockchain related application 160, etc.) generates a digital signature for the e-mail message at operation 470. The digital signature may utilize any conventional or other techniques (e.g., Secure/Multipurpose Internet Mail Extensions (S/MIME), blockchain or wallet signature, etc.), where the digital signature technique may be predetermined or pre-configured, or may be specified in the communication control policy.

For example, the application (e.g., mail client module 124, distributed application (dApp) 148, blockchain related application 160, etc.) may request authentication module 132 of authentication server system 130 (FIG. 1) to obtain a signed message from the user. In this case, the application accesses the information stored for a blockchain identity of the user (or associated with a communication identifier (e.g., e-mail address, etc.) of the user) on a blockchain and/or in an off-chain database to obtain a wallet address. By way of example, a blockchain 142 associated with the blockchain identity of the user in the form of a non-fungible token (NFT) domain (via a blockchain system 140) may be accessed to obtain a blockchain (or wallet) address corresponding to the non-fungible token (NFT) domain name of the user. The associated blockchain may be determined based on the name (e.g., a blockchain corresponding to an extension, etc.), or a mapping of blockchain identities to blockchains. A transaction for the non-fungible token (NFT) domain name may be identified on the associated blockchain, and the blockchain (or wallet) address for the non-fungible token (NFT) domain name may be ascertained from information stored on the associated blockchain for the transaction. Similarly, a communication identifier (e.g., e-mail address, etc.) of the user may be identified on the blockchain, and the corresponding blockchain (or wallet) address associated with the communication identifier may be ascertained.

The application (e.g., mail client module 124, distributed application (dApp) 148, blockchain related application 160, etc.) provides the blockchain (or wallet) address to authentication module 132. The authentication module generates a message that is sent to the blockchain (or wallet) address for the user to sign. The user logs in or otherwise accesses the wallet (e.g., via a username and password, wallet verification, etc.) in order to sign the message and verify the user. The signature may be provided on a user interface of client system 114 (e.g., as described below for FIG. 10B). Signing of the message in the wallet generates a digital signature of the message based on the private key of the wallet. The signed message or digital signature may be decrypted for verification based on a public key corresponding to the wallet (e.g., blockchain (or wallet) address, etc.). Since the private key is unique to the wallet, successful decryption of the message with the corresponding public key verifies the message was signed by the user.

The digital signature is provided in the e-mail for verification of the user as described below, and the application (e.g., mail client module 124, distributed application (dApp) 148, blockchain related application 160, etc.) sends the e-mail message at operation 485. The e-mail message is directed to mail module 182 of mail server system 180 for processing, where mail module 182 forwards the e-mail message to mail service system 170 based on the public e-mail address.

When the application (e.g., mail client module 124, distributed application (dApp) 148, blockchain related application 160, etc.) is not integrated with, or configured for, a blockchain or mail service system 170 as determined at operations 405 and 420, a communication identifier for the e-mail message is received from the user at operation 475. The communication identifier may serve as a destination for the e-mail message, and is preferably a public e-mail address of the intended recipient that directs the e-mail message to mail service system 170 for verification according to the communication control policy. The communication identifier may be provided on a user interface of client system 114 (e.g., as described below for FIG. 10A). The e-mail message is completed and the application receives a command to send the e-mail message at operation 480 (e.g., send button or other input mechanism on the user interface is actuated, etc.). The e-mail message is sent at operation 485 in response to the command. The e-mail message is directed to mail module 182 of mail server system 180 for processing, where mail module 182 forwards the e-mail message to mail service system 170 based on the public e-mail address.

Figure 5:
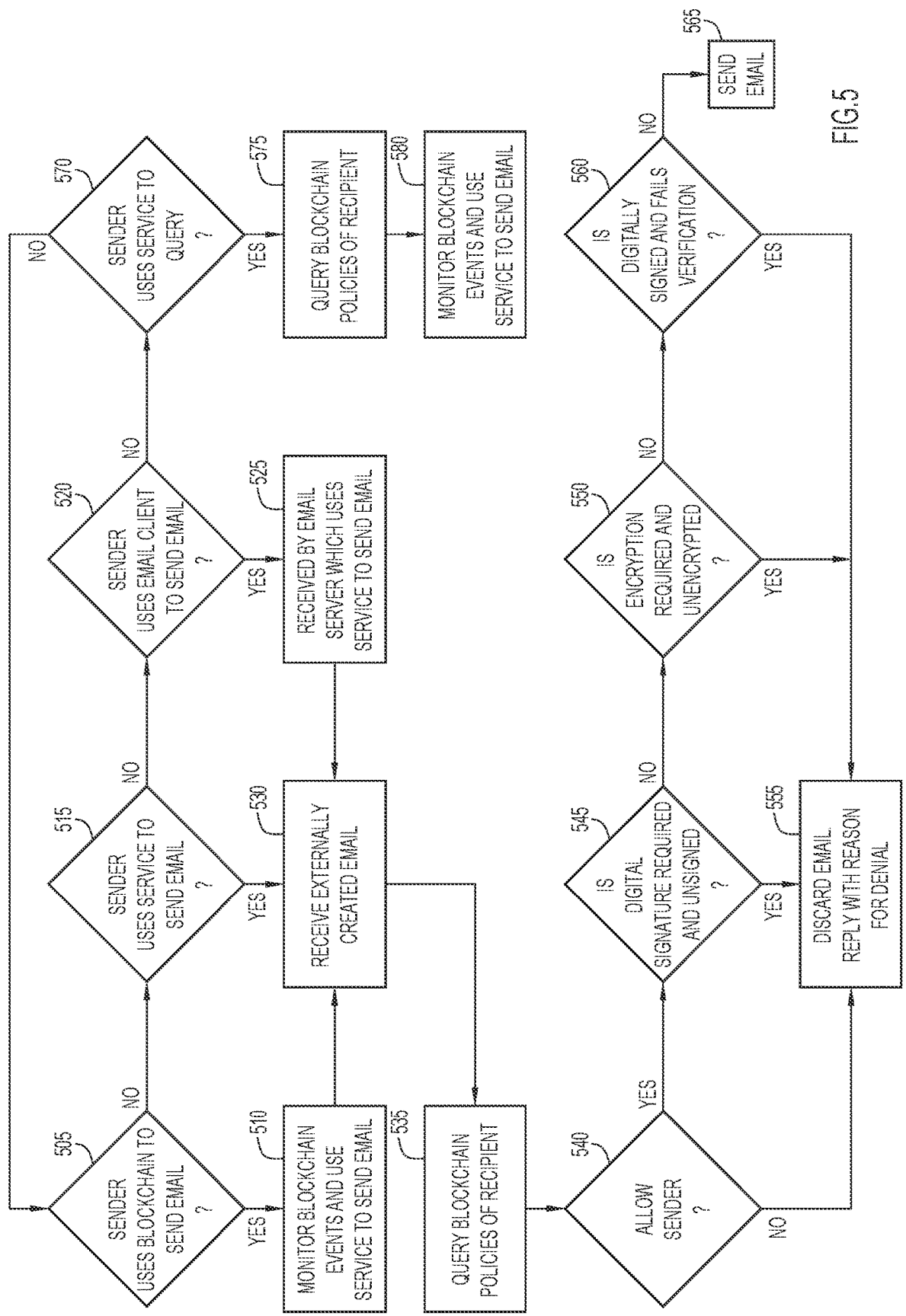
FIG. 5 is flowchart of a method of verifying an e-mail message based on a communication control policy according to an embodiment of the present invention.

A method 500 of verifying an e-mail message based on a communication control policy (e.g., via mail service module 172 and mail service system 170) according to an embodiment of the present invention is illustrated in FIG. 5. Initially, a communication control policy is created by a user of a blockchain identity for controlling communications to the user as described above. The communication control policy may include communication controls for one or more other users and be stored on a blockchain or in off-chain storage (e.g., database system 118, resource server system 150, etc.) as described above. By way of example, method 500 is described with respect to sending e-mail messages. However, various other communications (e.g., Voice Over IP (VOIP), social media postings or messages, text messages, phone calls, etc.) may be controlled in accordance with a communication control policy in substantially the same manner described below.

An application (e.g., mail client module 124, distributed application (dApp) 148, blockchain related application 160, etc.) composes an e-mail message for a user to send to an intended recipient having a blockchain identity. The e-mail message may be sent over a blockchain 142 or communication network 112 (e.g., via mail service system 170 and/or mail server system 180, etc.). The application may be configured accordingly as described above (e.g., configured for blockchain functionality, integrated (e.g., via an API) with mail service system 170, configured to provide the e-mail message to mail sever system 180, etc.).

When the e-mail message is sent over a blockchain 142 as determined at operation 505, mail service system 170 monitors the blockchain events to retrieve the e-mail message at operation 510. The e-mail message is provided to mail service module 172 at operation 530.

When the e-mail message is sent over an application programming interface (API) to mail server system 170 as determined at operation 515, the mail service system provides the e-mail to mail service module 172 at operation 530.

When the e-mail message is sent over communication network 112 to mail server system 180 as determined at operation 520, mail module 182 sends the e-mail message to mail service system 170 at operation 525. The e-mail message is provided to mail service module 172 at operation 530.

Once mail service module 172 receives the e-mail message at operation 530, service access module 174 queries a blockchain 142 (or database system 118, resource server system 150, etc.) for the communication control policy of the intended recipient at operation 535. Once the communication control policy for the intended recipient is retrieved, mail service module 172 applies the communication controls in the communication control policy specified for the user to the user at operation 540. This may be accomplished in substantially the same manner described above (e.g., for FIG. 4). When the user is not authorized to send the e-mail message to the intended recipient based on the communication control policy as determined at operation 540, the mail service module 172 discards the e-mail message at operation 555. In addition, the mail service module may provide a reason for termination of the e-mail message (e.g., in a reply e-mail message or other communication) to the user. The reason may include the communication control policy blocking communications for the user, and/or failure to satisfy the conditions or prerequisites indicated in the communication control policy.

When the user is verified to send e-mail messages to the intended recipient based on the communication control policy as determined at operation 540, mail service module 172 determines the presence of a requirement for a digital signature in the communication control policy. When a digital signature is required and the e-mail message lacks a digital signature as determined at operation 545, mail service module 172 discards the e-mail message at operation 555, and may provide the reason for termination of the e-mail message (e.g., in a reply e-mail message or other communication) to the user in substantially the same manner described above. The reason may indicate a failure to provide a digital signature, and may further provide the technique for producing the digital signature (e.g., corresponding to the digital signature indicated in the communication control policy, etc.).

When encryption is indicated for the e-mail message in the communication control policy and the e-mail message is unencrypted as determined at operation 550, mail service module 172 discards the e-mail message at operation 555, and may provide the reason for termination of the e-mail message (e.g., in a reply e-mail message or other communication) to the user in substantially the same manner described above. The reason may indicate a failure to encrypt the e-mail message, and may further provide the encryption technique and encryption key (e.g., corresponding to the encryption technique in the communication control policy, etc.).

Once a required digital signature and/or required encryption are determined to be present at operations 545 and 550, when the e-mail message includes a digital signature in accordance with the communication control policy, mail service module 172 may verify the digital signature at operation 560. The digital signature may utilize any conventional or other techniques (e.g., Secure/Multipurpose Internet Mail Extensions (S/MIME), blockchain or wallet signature, etc.), where the digital signature technique may be predetermined or pre-configured, or may be specified in the communication control policy. For example, a blockchain or wallet signature may be provided with the e-mail message. The wallet signature may be decrypted for verification by mail service module 172 or authentication module 132 of authentication server 130 (FIG. 1) based on a public key corresponding to the wallet (e.g., blockchain (or wallet) address, etc.) of the sender. Since the private key is unique to the wallet, successful decryption of the message with the corresponding public key verifies the message was signed by the user.

When the digital signature fails the verification as determined at operation 560, mail service module 172 discards the e-mail message at operation 555, and may provide the reason for termination of the e-mail message (e.g., in a reply e-mail message or other communication) to the user in substantially the same manner described above. The reason may indicate a failure of verification of the digital signature.

When the digital signature is verified as determined at operation 560, mail service module 172 sends the e-mail message at operation 565 to the private e-mail address of the intended recipient. The mail service module may perform a lookup of the public e-mail address of the intended recipient to determine the private e-mail address. The private e-mail address may be stored in a user profile on a blockchain or in off-chain storage, or in a list or library mapping public and private e-mail addresses. The e-mail message is directed to mail module 182 of mail server system 180 for processing, where mail module 182 forwards the e-mail message to the private e-mail address.

The intended recipient may check their mailbox (corresponding to the private e-mail address) for the e-mail message. Accordingly, the intended recipient receives e-mail messages that comply with the communication control policy.

When mail service system 170 receives a request from a client application (e.g., mail client module 124, distributed application (dApp) 148, blockchain related application 160, etc.) for a communication control policy of the intended recipient as determined at operation 570, service access module 174 queries a blockchain (or database system 118, resource server system 150, etc.) for the communication control policy of the recipient at operation 575. The request (e.g., corresponding to operation 430 of FIG. 4) may indicate the blockchain identity (or communication identifier) of the intended recipient for the query. Service access module 174 returns the communication control policy to the client application at operation 580 (e.g., to verify an e-mail message, etc.).

Figure 6:
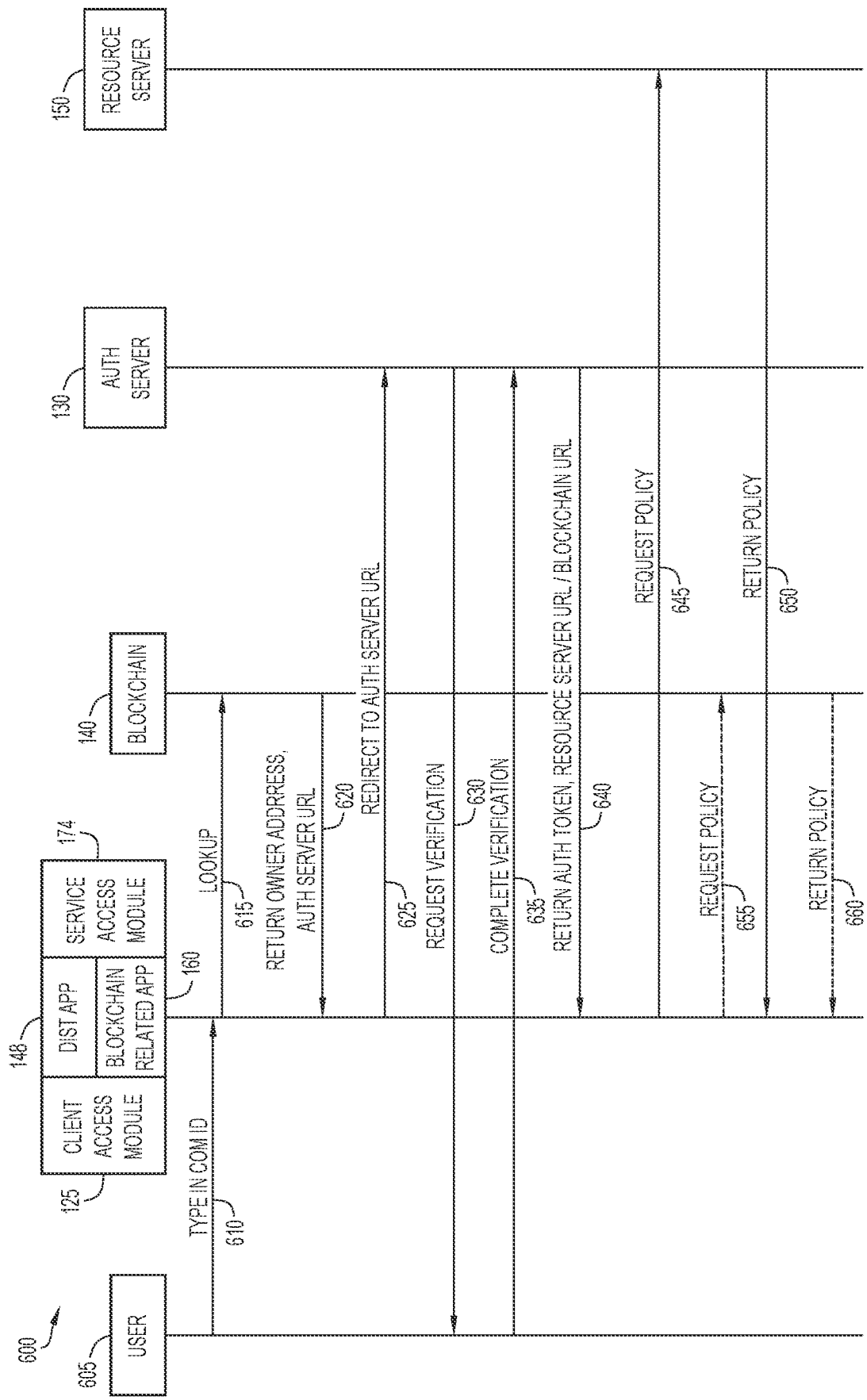
FIG. 6 is a flow diagram of a method of retrieving a communication control policy of an intended recipient of an e-mail message according to an embodiment of the present invention.

A method 600 of retrieving a communication control policy of an intended recipient of an e-mail message (e.g., via client access module 126, authentication module 132, data module 152, distributed application (dApp) 148 or blockchain related application 160, service access module 174, server system 110, client system 114, authentication system 130, blockchain system 140, resource server system 150, and/or mail service system 170) according to an embodiment of the present invention is illustrated in FIG. 6. Initially, a communication control policy is created by a user of a blockchain identity for controlling communications to the user as described above. The communication control policy may include communication controls for one or more other users and be stored on a blockchain or in off-chain storage (e.g., database system 118, resource server system 150, etc.) as described above. By way of example, method 600 is described with respect to sending e-mail messages. However, various other communications (e.g., Voice Over IP (VOIP), social media postings or messages, text messages, phone calls, etc.) may be controlled in accordance with a communication control policy in substantially the same manner described below.

An application (e.g., client access module 126, distributed application (dApp) 148, blockchain related application 160, service access module 174, etc.) may receive a communication identifier of an intended recipient of an e-mail message from a user 605 (via client system 114) at flow 610. The communication identifier includes a blockchain identity of the intended recipient. The blockchain identity may include any blockchain entity that is associated with, and/or may be used to identify, a corresponding user (e.g., non-fungible token (NFT) owned by the user, a fungible token owned by the user, a non-fungible token (NFT) domain name of the user, a wallet address for the user, etc.). Further, the blockchain identity may include any quantity of terms, words, tokens, or arrangements of any quantity of any types of elements (e.g., alphanumeric or other characters, symbols, numbers, etc.). For example, the blockchain identity may include a name portion and an optional extension (e.g., "name.e1", etc.). Alternatively, the blockchain identity may include the name portion without the extension. The name portion and extension may each include any quantity of terms, words, tokens, or arrangements of any quantity of any types of elements (e.g., alphanumeric or other characters, symbols, numbers, etc.).

The application (e.g., client access module 126, distributed application (dApp) 148, blockchain related application 160, service access module 174, etc.) accesses a blockchain 142 associated with the blockchain identity (via a blockchain system 140), and performs a lookup for the blockchain identity at flow 615. The associated blockchain may be determined based on the name (e.g., a blockchain corresponding to an extension, etc.), a mapping of blockchain identities to blockchains, or a blockchain indication received from the user with the name of the blockchain identity. For example, a transaction for a blockchain identity in the form of a non-fungible token (NFT) domain may be identified on the associated blockchain based on the name of the non-fungible token (NFT) domain, and the blockchain (or wallet) address or other identifying information for the non-fungible token (NFT) domain may be ascertained from information stored on the associated blockchain for the transaction.

The blockchain system returns the identifying information of the user corresponding to the blockchain identity and a uniform resource locator (URL) or address of authentication server system 130 at flow 620. The application (e.g., client access module 126, distributed application (dApp) 148, blockchain related application 160, service access module 174, etc.) redirects to the authentication server system at flow 625 to verify the application for requesting the communication control policy at flow 630. This may be accomplished using conventional or other techniques (e.g., password, code, application identifier, token, encrypted data, etc.) at flow 635.

Authentication module 132 of authentication server system 130 provides to the application (e.g., client access module 126, distributed application (dApp) 148, blockchain related application 160, service access module 174, etc.) a token indicating the application verification and a uniform resource locator (URL) or address of a resource server system 150 storing the corresponding communication control policy at flow 640. The application requests the communication control policy from data module 152 of resource server system 150 at flow 645. The application further provides the token from the authentication server system to verify the application to the resource server system. The data module retrieves and provides the requested communication control policy to the application at flow 650. The communication control policy may be retrieved based on the blockchain identity and/or identifying information of the intended recipient.

Alternatively, the communication control policy may be stored on a corresponding blockchain 142 (e.g., of the blockchain identity, etc.). In this case, authentication module 132 of authentication server system 130 provides to the application (e.g., client access module 126, distributed application (dApp) 148, blockchain related application 160, service access module 174, etc.) a token indicating the application verification and a uniform resource locator (URL) or other indicator of a blockchain system 140 storing the communication control policy at flow 640. The application requests the communication control policy from blockchain system 140 at flow 655. The application further provides the token from the authentication server system to verify the application to the blockchain system. The blockchain system retrieves and provides the requested communication control policy to the application at flow 660. The communication control policy may be retrieved based on the blockchain identity and/or identifying information of the intended recipient.

The communication control policy is used to control communications to the intended recipient in substantially the same manner described above.

Operation of an embodiment of the present invention for an example scenario is described with respect to FIGS. 7-9, 10A, and 10B. Initially, user A has a blockchain identity (e.g., userA.e1), and establishes a public e-mail address through a privacy service (e.g., mail service module 172) that guards and forwards e-mail messages to a private e-mail address of user A (e.g., associated with a mailbox to receive e-mail messages). User A shares the public e-mail address (e.g., with other users, applications, etc.), but does not share the private e-mail address.

User A configures communication controls for user B and user C to allow these users to send user A e-mail messages. User A may access a user interface 700 (FIG. 7) of an administration section provided by registration module 116 to add communication controls for user B and user C to the communication control policy for user A.

By way of example, user interface 700 displays a communication control policy or table 705 with columns or fields for information including a name field 710, a communication identifier field 715, a permissions (allow/block) field 720, a signature field 725, an encryption field 730, an actions field 735, and a conditions field 740. Name field 710 indicates a user name or other identifier to specify a sender of e-mail messages (e.g., NAME1-NAME4 as shown in FIG. 7). Communication identifier field 715 indicates a communication identifier of a sender of e-mail messages. For example, the communication identifier may include e-mail addresses (e.g., EMAIL1 and EMAIL3 as shown in FIG. 7) and/or blockchain identities (e.g., NAME2.E2 and NAME4.E4 as shown in FIG. 7).

Permissions field 720 indicates permitted operations or actions (e.g., allow or block e-mail messages from the corresponding communication identifier as shown in FIG. 7). Signature field 725 indicates the requirement for a digital signature (e.g., Y/N as shown in FIG. 7) and/or the type of digital signature required (e.g., SIG TYPE as shown in FIG. 7). The type of digital signature may include any conventional or other signature (e.g., blockchain or wallet signature, Secure/Multipurpose Internet Mail Extensions (S/MIME) signature, etc.). Encryption field 730 indicates the requirement for encryption (e.g., Y/N as shown in FIG. 7) and/or the type of encryption required (e.g., ENC TYPE as shown in FIG. 7). The encryption field may further indicate information for the encryption (e.g., an encryption key, etc.). The encryption may utilize any conventional or other encryption techniques (e.g., public/private key, etc.).

Actions field 735 indicates actions for a user to perform on entries in table 705 (e.g., ACTION1-ACTION4 as shown in FIG. 7, such as edit, delete, etc.). For example, a user may change permissions, requirements for signatures, requirements for encryption, and/or conditions for an entry, or delete the entry. Conditions field 740 indicates conditions or prerequisites for enabling the corresponding permissions (e.g., COND2 and COND4 as shown in FIG. 7). The conditions or prerequisites may indicate any logical or other expressions with attributes corresponding to labels or other identifiers of data associated with the communication identifier. The conditions or prerequisites in combination with the permissions, requirements for signature, and/or requirements for encryption basically form rules for controlling communications (e.g., when satisfaction of the conditions occurs, enable the corresponding permission (e.g., allow or block)).

Figure 8:
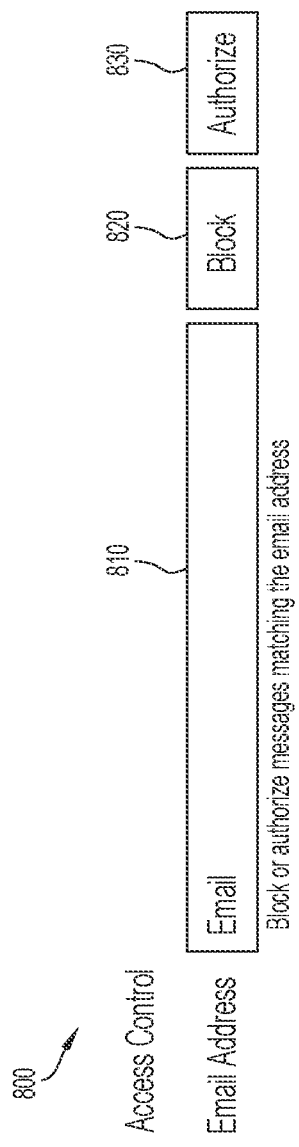
FIG. 8 is a schematic illustration of an example graphical user interface for defining communication controls for a communication identifier according to an embodiment of the present invention.

User A adds communication controls for user B and user C in table 705 to enable e-mail messages to be received from those users. By way of example, a user interface 800 (FIG. 8) includes a field 810 to receive a communication identifier, a block actuator 820, and an authorize actuator 830. User A enters a corresponding communication identifier of user B in field 810 (e.g., an e-mail address or EMAIL as shown in FIG. 8), and actuates authorize actuator 830 to allow user B to send e-mail messages to user A. In order to block user B from sending e-mail messages to user A, block actuator 820 may be actuated after entry of the communication identifier.

Once actuator 830 is actuated for the communication identifier of user B, a signature request is initiated for the blockchain wallet associated with user A. User A accesses the blockchain wallet and views a user interface 900 (FIG. 9) to sign the message. By way of example, user interface 900 includes an account area 905 indicating account information, a message area 910 indicating authorization of receipt of e-mail, an actuator 915 to sign the message, and an actuator 920 to cancel the action.

User A actuates actuator 915 to sign the message. Once the message is signed, the corresponding communication controls are provided to table 705, and communications from user B are controlled according to the communication control policy.

Communication controls for user C may be entered in substantially the same manner described above. User A may trust other users with the same blockchain domain as user A, and may add communication controls to receive e-mail messages from those other users. User A may further configure communication controls to block e-mail messages from all other e-mail addresses to avoid spam. Further, user A may add configuration controls to allow e-mail messages from applications when registering to use those applications, or permit applications to add the communication controls. In addition, user A desires security, and adds communication controls to require digital signatures on e-mail messages. User A further desires to receive encrypted e-mail messages, and may configure public encryption keys. However, user A does not require encryption of e-mail messages.

Figures 10A, 10B:
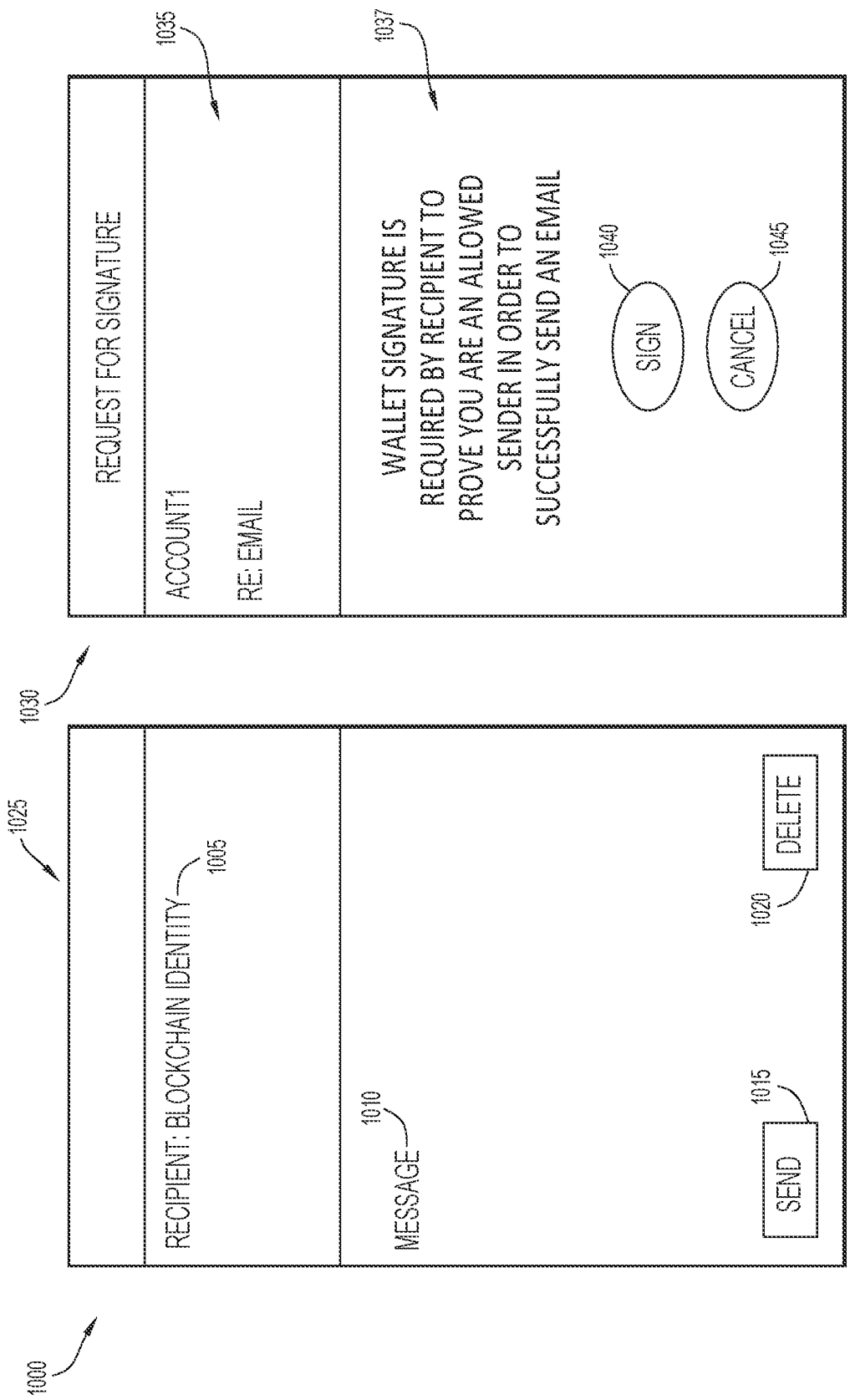
FIG. 10A is a schematic illustration of an example graphical user interface for composing an e-mail message according to an embodiment of the present invention.
FIG. 10B is a schematic illustration of an example graphical user interface of a wallet verification for verifying a user sending the e-mail message of FIG. 10A according to an embodiment of the present invention.

User B logs in to a blockchain integrated e-mail client to compose an e-mail message. By way of example, FIG. 10A illustrates a user interface 1000 for generating an e-mail message 1025. The e-mail message includes a recipient field 1005 to receive a communication identifier for an intended recipient and a message area 1010 to receive message content. User interface 1000 further includes a send actuator 1015 to send the e-mail message and a delete actuator 1020 to delete the e-mail message. User B enters the blockchain identity of user A in recipient field 1005 to serve as a destination for the e-mail message. The e-mail client queries a blockchain to resolve the blockchain identity and determines, based on the communication control policy of user A, that user B is allowed to send e-mail messages to user A, must digitally sign the e-mail message, and may optionally encrypt the e-mail message. User B finishes composing the e-mail message and, since the e-mail message does not contain sensitive material, chooses not to encrypt the e-mail message.

User B actuates send actuator 1015, and the e-mail client prompts user B to sign the e-mail message using a corresponding blockchain wallet. User B accesses the blockchain wallet and views a user interface 1030 (FIG. 10B) to sign the e-mail message. By way of example, user interface 1030 includes an account area 1035 indicating account information, a message area 1037 indicating verification of the sender, an actuator 1040 to sign the message, and an actuator 1045 to cancel the action.

User B actuates actuator 1040 to sign the e-mail message to verify the identity of user B. Once the e-mail message is signed, the e-mail message is sent to the public e-mail address of user A, eventually arriving at a mail service server (e.g., mail service system 170) for the public e-mail address. The mail service server verifies that user B is allowed to send e-mail messages to user A and that the blockchain or wallet signature is valid, and privately forwards the e-mail message to the private e-mail address of user A. User A checks the private e-mail account and finds an e-mail message from user B. User A replies to the e-mail message from user B, however, the original e-mail address of user A has been encoded to help protect the privacy of user A. The reply e-mail message is automatically sent to the mail service server (e.g., mail service system 170) where the public e-mail address of user A replaces the private e-mail address of user A in the reply e-mail message so that the reply e-mail message user B eventually receives includes the public e-mail address of user A.

User C may log in to their e-mail client (e.g., without integration to a blockchain) to generate an e-mail message. User C enters the public e-mail address of user A into the recipient field in substantially the same manner described above for FIG. 10A. User C finishes composing the e-mail message, and sends the e-mail message that is routed to the mail service system (e.g., mail service system 170). The mail service system rejects the e-mail message due to a lack of a digital signature, and sends a reply to user C indicating that user A would allow the e-mail message when signed by user C. User C obtains a Secure/Multipurpose Internet Mail Extensions (S/MIME) digital signature certificate, and configures the digital signature in the e-mail client. User C re-sends the e-mail message to user A after digitally signing the e-mail message. The mail service server (e.g., mail service system 170) verifies that user C is allowed to send e-mail messages to user A, and that the S/MIME digital signature is valid. The mail service server privately forwards the e-mail message to the private e-mail address of user A. User A checks the account associated with the private e-mail address, and finds the e-mail message from user C. Replies to user C from user A are handled in substantially the same manner described above.

User D has a blockchain identity with the same domain as the blockchain identity of user A. User D went to school with user A, and decides to reconnect by sending user A an e-mail message. The interaction and processing of the e-mail message is substantially similar to either user B or user C described above depending on the configuration of the e-mail client of user D (e.g., integrated with a blockchain (similar to user B) or not integrated with a blockchain (similar to user C)).

A marketing service may obtain the public e-mail address of user A, and sends an unsolicited e-mail message to user A. The e-mail message is routed to the mail service server (e.g., mail service system 170), and the e-mail message is rejected based on the communication control policy of user A. User A checks the account associated with the private e-mail address and has no e-mail messages from the marketing service (e.g., not even in a separate junk folder).

Present invention embodiments may provide various technical and other advantages. For example, e-mail policies may be expanded beyond sender address, and may be based on a blockchain identity and blockchain activity (e.g., allow e-mail messages from users with a certain non-fungible token (NFT) or blockchain domain, etc.). This provides greater e-mail filtering capabilities to prevent spam. Further, present invention embodiments provide public to private alias routing to multiple private e-mail addresses and/or to non-e-mail services based on policy extensions, thereby enhancing security by maintaining private e-mail addresses confidential. In addition, present invention embodiments may be applied in substantially the same manner described above to other messaging mechanisms (e.g., social media messages or posts, push notifications, direct messaging (e.g., text messages, phone calls, voice over IP (VOIP), etc.), etc.).

Present invention embodiments provide enhanced security and communication control. By way of example, verification for allowing e-mail messages or other communications may use private keys of blockchains to verify the sender. Moreover, a single blockchain identity (e.g., non-fungible token (NFT) domain name, etc.) may be used as a universal e-mail or other communication address, thereby streamlining control policies and providing an enhanced user experience. In addition, present invention embodiments may provide any permissions, requirements, and/or conditions to indicate with specificity particular groups of users to allow or block communications, thereby limiting communications to those from intended senders.

The communication control policy of the present invention embodiments is not limited to the scenarios described above, and may be applied to control communications for any communications and/or entities. For example, the communication control policy may be used to control communications from applications, define a routing matrix controlling bridging of different types of communication channels and/or users, control use of user communication medium preferences, control use of notifications (e.g., control senders and receivers, etc.), etc.

It will be appreciated that the embodiments described above and illustrated in the drawings represent only a few of the many ways of implementing embodiments for controlling communications based on control policies with blockchain associated rules and blockchain authorization. In addition, characteristics or features of embodiments of the present invention may be combined in any fashion to provide additional embodiments of the present invention.

The environment of the present invention embodiments may include any number of computer or other processing systems (e.g., client or end-user systems, server systems, blockchain systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including registration module 116, interface module 122, mail client module 124, client access module 126, authentication module 132, data module 152, blockchain related applications 160, mail service module 172, service access module 174, mail module 182, etc.), etc.). These systems may include any types of monitors and input devices (e.g., keyboard, mouse, voice recognition, etc.) to enter and/or view information.

It is to be understood that the software of the present invention embodiments (e.g., registration module 116, interface module 122, mail client module 124, client access module 126, authentication module 132, data module 152, blockchain related applications 160, mail service module 172, service access module 174, mail module 182, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, server, authentication, blockchain, resource, mail service, and mail systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., registration module 116, interface module 122, mail client module 124, client access module 126, authentication module 132, data module 152, blockchain related applications 160, mail service module 172, service access module 174, mail module 182, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with standalone systems or systems connected by a network or other communications medium. The computer useable or readable medium (or media) may include instructions executable by one or more processors to perform functions of present invention embodiments described herein.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., verification results, metadata associated with blockchain verifications, mappings of blockchain identities to blockchains, communication control policies, etc.). The database system may be implemented by any number of any conventional or other databases, data stores or storage structures to store information. The database system may be included within or coupled to the server, client, authentication, blockchain, resource, mail service, and mail systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., verification results, communication identifier, name and/or other attributes of a blockchain identity, communication controls, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., verification results, etc.).

The present invention embodiments are not limited to the specific tasks or algorithms described above, but may be utilized for controlling any types of communications for any applications, services, data sources, functionalities, code, and/or platforms based on a communication control policy.

The present invention embodiments may process communications from any entity (e.g., user, application, service, computing or other device, etc.), and utilize any communication identifier to indicate a destination or users for communication controls. A communication identifier may include any identifier that is associated with, and/or may be used to identify or resolve to, a user, location, and/or address for communication (e.g., e-mail address, handles, mobile phone numbers, blockchain identity, etc.). The e-mail addresses may include a name/account portion and a domain (or address identifier) portion (e.g., "name@domain", etc.). The name/account portion and domain portion may each include any quantity of terms, words, tokens, or arrangements of any quantity of any types of elements (e.g., alphanumeric or other characters, symbols, numbers, etc.).

A blockchain identity may include any blockchain entity or asset that is associated with, and/or may be used to identify, a corresponding user (e.g., non-fungible token (NFT) owned by the user, a fungible token owned by the user, a non-fungible token (NFT) domain name of the user, a cryptocurrency or other wallet address for the user, etc.). The asset may correspond to various items (e.g., blockchain or other domain name, digital art, music, video game items, non-fungible tokens (NFTs), fungible tokens, etc.). The blockchain identity may be indicated by any name or identifier including any quantity of terms, words, tokens, or arrangements of any quantity of any types of elements (e.g., alphanumeric or other characters, symbols, numbers, etc.). The name or identifier preferably includes a name or identifier portion and an optional extension (e.g., "name.e1", etc.). Alternatively, the name or identifier may include the name or identifier portion without the extension. The name and/or extension may be used for partial or exact matching for name lookups (e.g., to obtain blockchain (or wallet) addresses and/or other attributes, etc.). The name or identifier portion and extension may each include any quantity of terms, words, tokens, or arrangements of any quantity of any types of elements (e.g., alphanumeric or other characters, symbols, numbers, etc.).

Any quantity of any blockchain, user or other attributes may be associated with a blockchain identity. The user associated with a communication control policy and a sender of an e-mail message may be verified in any manner (e.g., signing a message, user verification, encryption/decryption, username/password, etc.).

The communication control policy may include any information arranged in any fashion (e.g., names, communication identifiers, permissions, requirement for a digital signature, requirement for a encryption, actions, conditions, etc.). The communication control policy may be associated with a user or application via any information (e.g., application identifiers or keys, user information, etc.). The communication control policy may be stored on a blockchain and/or an off-chain data source. The data source may include any storage structure (e.g., decentralized storage structure or platform, blockchain storage, database, etc.). The communication control policy may be associated with a user and/or application in any fashion, and may be stored and retrieved based on any information (e.g., based on user information (e.g., wallet address, blockchain identity, user name, etc.), application identifier or key, etc.). The communication control policy may be stored on the blockchain at any desired address (e.g., wallet or other address associated with the user, application, a designated user or administrator, etc.).

The permissions may include any operations performed (e.g. allow or block, etc.). The requirement for digital signature may include any indicators of a presence or absence for the requirement, a type of the digital signature, and/or any information for generating/decrypting the digital signature. The type of digital signature may include any conventional or other signature (e.g., blockchain address or wallet signature, Secure/Multipurpose Internet Mail Extensions (S/MIME) signature, etc.). The requirement for encryption may include any indicators of a presence or absence for the requirement, a type of the encryption, and/or any information for encrypting/decrypting the communication. The conditions may be provided in any format, and may include any desired conditions or events with respect to any information or attributes (e.g., blockchain activity, user attributes, etc.). The communication control policy may identify users based on any identifiers or indicators (e.g., blockchain entities or assets, e-mail addresses, handles, telephone numbers, user names, etc.). The blockchain identities may be from any desired blockchains, and may be from the same and/or different blockchains. For example, senders may be allowed to send communications for blockchain identities from the same or different blockchains.

Having described preferred embodiments of a new and improved system, method, and computer program product for controlling communications based on control policies with blockchain associated rules and blockchain authorization, it is believed that other modifications, variations and changes will be suggested to those skilled in the art in view of the teachings set forth herein. It is therefore to be understood that all such variations, modifications and changes are believed to fall within the scope of present invention embodiments as defined by the appended claims.

What is claimed is:

1. A method of controlling communications comprising:
   receiving, via at least one processor, a communication for an intended recipient, wherein the communication includes a communication identifier for the intended recipient that serves as a destination for the communication;
   verifying, via the at least one processor, a sender of the communication against a communication control policy of the intended recipient that controls communications from users to the intended recipient by identifying a blockchain identity of the sender within the communication control policy, wherein the communication control policy includes blockchain identities for one or more users, a permitted action for communications for each of the blockchain identities, and at least one condition for attributes of the blockchain identities to control the communications from the one or more users to the intended recipient, wherein the blockchain identities each indicate a non-fungible token corresponding to a blockchain domain name owned by a corresponding user; and
   controlling, via the at least one processor, transference of the communication to the intended recipient in accordance with the permitted action and the at least one condition indicated for the blockchain identity of the sender in the communication control policy.

2. The method of claim 1, wherein the communication includes an e-mail message.

3. The method of claim 2, wherein the communication identifier corresponds to one or more from a group of a blockchain domain name, a cryptocurrency wallet address, and a non-fungible token.

4. The method of claim 3, wherein verifying the communication further comprises:
   replacing the communication identifier in the communication with an e-mail address of the intended recipient; and
   verifying the communication against the communication control policy of the intended recipient via a processor of the at least one processor associated with the e-mail address; and
   wherein controlling transference of the communication further comprises:
   sending the communication to the e-mail address of the intended recipient in accordance with the communication control policy.

5. The method of claim 2, wherein the communication identifier includes an e-mail address of the intended recipient, and verifying the communication further comprises:
   verifying the communication against the communication control policy of the intended recipient via a processor of the at least one processor associated with the e-mail address; and
   wherein controlling transference of the communication further comprises:
   sending the communication to the e-mail address of the intended recipient in accordance with the communication control policy.

6. The method of claim 1, wherein the communication control policy further includes actions to allow or block the one or more users, and one or more from a group of a requirement for encrypting the communication, a requirement for a digital signature for the communication, and at least one condition for attributes of the one or more users.

7. The method of claim 6, wherein the communication control policy includes the requirement for the digital signature in a form of a blockchain address signature for the communication, wherein the blockchain address signature is based on a blockchain address private key, and verifying the communication comprises:
   decrypting the blockchain address signature of the communication via a corresponding blockchain address public key to verify the communication.

8. A system for controlling communications comprising:
   one or more memories; and
   at least one processor coupled to the one or more memories, the at least one processor configured to:
   receive a communication for an intended recipient, wherein the communication includes a communication identifier for the intended recipient that serves as a destination for the communication;
   verify a sender of the communication against a communication control policy of the intended recipient that controls communications from users to the intended recipient by identifying a blockchain identity of the sender within the communication control policy, wherein the communication control policy includes blockchain identities for one or more users, a permitted action for communications for each of the blockchain identities, and at least one condition for attributes of the blockchain identities to control the communications from the one or more users to the intended recipient, wherein the blockchain identities each indicate a non-fungible token corresponding to a blockchain domain name owned by a corresponding user; and control transference of the communication to the intended recipient in accordance with the permitted action and the at least one condition indicated for the blockchain identity of the sender in the communication control policy.

9. The system of claim 8, wherein the communication includes an e-mail message.

10. The system of claim 9, wherein the communication identifier corresponds to one or more from a group of a blockchain domain name, a cryptocurrency wallet address, and a non-fungible token.

11. The system of claim 10, wherein verifying the communication further comprises:

replacing the communication identifier in the communication with an e-mail address of the intended recipient; and verifying the communication against the communication control policy of the intended recipient via a processor of the at least one processor associated with the e-mail address; and wherein controlling transference of the communication further comprises:

sending the communication to the e-mail address of the intended recipient in accordance with the communication control policy.

12. The system of claim 9, wherein the communication identifier includes an e-mail address of the intended recipient, and verifying the communication further comprises:

verifying the communication against the communication control policy of the intended recipient via a processor of the at least one processor associated with the e-mail address; and wherein controlling transference of the communication further comprises:

sending the communication to the e-mail address of the intended recipient in accordance with the communication control policy.

13. The system of claim 8, wherein the communication control policy further includes actions to allow or block the one or more users, and one or more from a group of a requirement for encrypting the communication, a requirement for a digital signature for the communication, and at least one condition for attributes of the one or more users.

14. The system of claim 13, wherein the communication control policy includes the requirement for the digital signature in a form of a blockchain address signature for the communication, wherein the blockchain address signature is based on a blockchain address private key, and verifying the communication comprises:

decrypting the blockchain address signature of the communication via a corresponding blockchain address public key to verify the communication.

15. A computer program product for controlling communications, the computer program product comprising one or more non-transitory computer readable media having instructions stored thereon, the instructions executable by at least one processor to cause the at least one processor to:

receive a communication for an intended recipient, wherein the communication includes a communication identifier for the intended recipient that serves as a destination for the communication;

verify a sender of the communication against a communication control policy of the intended recipient that controls communications from users to the intended recipient by identifying a blockchain identity of the sender within the communication control policy, wherein the communication control policy includes blockchain identities for one or more users, a permitted action for communications for each of the blockchain identities, and at least one condition for attributes of the blockchain identities to control the communications from the one or more users to the intended recipient, wherein the blockchain identities each indicate a non-fungible token corresponding to a blockchain domain name owned by a corresponding user; and control transference of the communication to the intended recipient in accordance with the permitted action and the at least one condition indicated for the blockchain identity of the sender in the communication control policy.

16. The computer program product of claim 15, wherein the communication includes an e-mail message.

17. The computer program product of claim 16, wherein the communication identifier corresponds to one or more from a group of a blockchain domain name, a cryptocurrency wallet address, and a non-fungible token.

18. The computer program product of claim 17, wherein verifying the communication further comprises:

replacing the communication identifier in the communication with an e-mail address of the intended recipient; and verifying the communication against the communication control policy of the intended recipient via a processor of the at least one processor associated with the e-mail address; and wherein controlling transference of the communication further comprises:

sending the communication to the e-mail address of the intended recipient in accordance with the communication control policy.

19. The computer program product of claim 16, wherein the communication identifier includes an e-mail address of the intended recipient, and verifying the communication further comprises:

verifying the communication against the communication control policy of the intended recipient via a processor of the at least one processor associated with the e-mail address; and wherein controlling transference of the communication further comprises:

sending the communication to the e-mail address of the intended recipient in accordance with the communication control policy.

20. The computer program product of claim 15, wherein the communication control policy further includes actions to allow or block the one or more users, and one or more from a group of a requirement for encrypting the communication, a requirement for a digital signature for the communication, and at least one condition for attributes of the one or more users.

21. The computer program product of claim 20, wherein the communication control policy includes the requirement for the digital signature in a form of a blockchain address signature for the communication, wherein the blockchain address signature is based on a blockchain address private key, and verifying the communication comprises:

decrypting the blockchain address signature of the communication via a corresponding blockchain address public key to verify the communication.

\* \* \* \* \*